United States Patent
Lambeth

(10) Patent No.: US 10,047,877 B2
(45) Date of Patent: Aug. 14, 2018

(54) UTILITY LINE SHROUD

(71) Applicant: Spencer J Lambeth, Sandy Springs, GA (US)

(72) Inventor: Spencer J Lambeth, Sandy Springs, GA (US)

( * ) Notice: Subject to any disclaimer, the term of this patent is extended or adjusted under 35 U.S.C. 154(b) by 222 days.

(21) Appl. No.: 15/187,223

(22) Filed: Jun. 20, 2016

(65) Prior Publication Data
US 2016/0369917 A1 Dec. 22, 2016

Related U.S. Application Data

(60) Provisional application No. 62/182,665, filed on Jun. 22, 2015.

(51) Int. Cl.
*F16L 1/11* (2006.01)
*E03B 9/10* (2006.01)

(52) U.S. Cl.
CPC .. *F16L 1/11* (2013.01); *E03B 9/10* (2013.01)

(58) Field of Classification Search
CPC ........... F16L 1/11; F16L 2201/60; E03B 7/09; E03B 7/095; E03B 7/10; E03B 9/01; G02B 6/4451; G02B 6/50; G02B 6/504
USPC ..................... 116/209; 33/1 G, 1 H
See application file for complete search history.

(56) References Cited

U.S. PATENT DOCUMENTS

| | | | |
|---|---|---|---|
| 2,942,625 A | 6/1960 | Costanzo | |
| 3,166,041 A * | 1/1965 | Caggainello | B65D 90/48 116/173 |
| 3,322,198 A | 5/1967 | McHenry | |
| 3,728,464 A | 4/1973 | Griffing | |
| 3,927,637 A * | 12/1975 | Sammaritano | H02G 9/00 116/209 |
| 4,275,757 A | 6/1981 | Singer | |
| 4,757,595 A | 7/1988 | Fraering, Jr. | |
| 5,003,735 A * | 4/1991 | Bates | E04B 5/48 116/209 |
| 5,044,303 A * | 9/1991 | Culver, Jr. | F16L 1/11 116/209 |
| 5,063,996 A | 11/1991 | Kenner | |
| 5,092,556 A * | 3/1992 | Darling et al. | A01G 25/00 116/173 |
| 5,176,408 A | 1/1993 | Pedersen | |

(Continued)

FOREIGN PATENT DOCUMENTS

| | | | | |
|---|---|---|---|---|
| CA | 1272074 A | * | 7/1990 | ............... E03B 9/02 |
| DE | 2134941 A1 | * | 2/1973 | ............... F16L 1/11 |

(Continued)

OTHER PUBLICATIONS

Ford Meter Box Company, Inc.; "Ford Type X Single Lid Covers/Ford PMBC-3 Plastic Meter Box Cover"; www.fordmeterbox.com/products; Jun. 2015; 2 pages; Ford Meter Box Company, Inc.; Wabash, Indiana, USA.

(Continued)

*Primary Examiner* — R. A. Smith
(74) *Attorney, Agent, or Firm* — Thomas B. McGurk

(57) ABSTRACT

A shroud for covering a portion of a utility line, such as the end of a clean out line for an in-ground sewer is encompassed by the present disclosure. The shroud can include a body forming a cavity for enclosing a portion of a utility line and an access port for accessing the utility line. A method for covering a portion of a utility line is also provided.

25 Claims, 19 Drawing Sheets

(56) References Cited

U.S. PATENT DOCUMENTS

| | | | |
|---|---|---|---|
| 5,234,280 A | | 8/1993 | Cowan |
| 5,623,971 A | * | 4/1997 | Foernzler ............... E03F 5/0406 116/209 |
| 5,642,973 A | | 7/1997 | Pretty |
| 5,769,565 A | | 6/1998 | Martin, Jr. et al. |
| 6,032,697 A | | 3/2000 | Kennedy |
| 6,062,506 A | | 5/2000 | Eck et al. |
| 6,083,392 A | | 7/2000 | Rigney |
| 6,109,824 A | | 8/2000 | Annes |
| 6,164,317 A | | 12/2000 | Hanson |
| 6,321,679 B1 | * | 11/2001 | Murrin et al. ....... G02B 6/4442 116/209 |
| 7,228,813 B2 | | 6/2007 | Flamingo et al. |
| 8,757,930 B2 | | 6/2014 | Kiest, Jr. |
| 8,844,559 B1 | | 9/2014 | Dry |
| 9,518,369 B2 | * | 12/2016 | Ducote et al. .......... E02D 29/14 |
| 2002/0073915 A1 | | 6/2002 | Howard |
| 2008/0142108 A1 | | 6/2008 | Baker et al. |

FOREIGN PATENT DOCUMENTS

| | | | | |
|---|---|---|---|---|
| DE | 202012004001 U1 | * | 5/2012 | ............... E03B 9/08 |
| DE | 2020171021 U1 | * | 5/2017 | ............. E02D 29/14 |
| EP | 2474671 A2 | * | 7/2012 | ......... E02D 29/1409 |
| KR | 20020034141 A | * | 5/2002 | ............... E03B 9/10 |

OTHER PUBLICATIONS

NDS, Inc.; "Valve and Meter Boxes"; www.ndspro.com; Jun. 2015; 2 pages; NDS, Inc.; Lindsay, California, USA.

City of Lake Oswego Engineering Division; "Typical Sanitary Sewer Cleanout: Drawing No. WW3-01B"; www.ci.oswego.or.us/publicworks/ww3-01b; 1998; 1 page; City of Lake Oswego; Lake Oswego, Oregon, USA.

City of Lake Oswego Engineering Division; "Typical Sanitary Sewer Cleanout: Drawing No. WW3-01A"; www.ci.oswego.or.us/publicworks/ww3-01a; 2000; 1 page; City of Lake Oswego; Lake Oswego, Oregon, USA.

The Dobbie Dico Meter Co. (W.A.) Pty Ltd; "Access Ground Covers"; www.dobbie.com.au/node/117; 1 page; The Dobbie Dico Meter Co. (W.A.) Pty Ltd; Malaga, Western Australia.

International Searching Authority/US; "PCT International Search Report: PCT/US2016/038383";PCT/ISA/210; WO2016209771; dated 2016; 4 pages; International Searching Authority/US; Alexandria, Virginia, USA.

International Searching Authority/US; "PCT Written Opinion of the International Searching Authority: PCT/US2016/038383";PCT/ISA/210; WO2016209771; dated 2016; 5 pages; International Searching Authority/US; Alexandria, Virginia, USA.

* cited by examiner

UTILITY LINE SHROUD

RELATED APPLICATION

This application is claims the benefit of priority to U.S. Provisional Application No. 62/182,665, filed Jun. 22, 2015. The provisional application identified above is hereby incorporated by reference in its entirety herein to provide continuity of disclosure.

TECHNICAL FIELD

The present disclosure is directed generally to protective covers, and, more specifically, to protective shrouds for in-ground utility lines.

BACKGROUND

When a building is connected to a municipal sewer line, a clean out pipe typically is installed in conjunction with the line leading from the building to the sewer to allow access to both for line maintenance. The access end of the clean out line typically is installed at or below grade. In the case of residential units, most jurisdictions require a separate clean out line for each unit. Thus, for multi-unit construction, such as townhomes, several clean out lines can be installed in a relatively small space. During construction of a building, heavy trucks and other equipment are often driven over ground containing one or more clean out lines and other utility lines, thereby raising the risk of damage to these lines. Consequently, there is a need for a system that can potentially provide some protection for and warning of the presence of an in-ground utility line, such as a sewer clean out line.

SUMMARY

The present disclosure encompasses a shroud for covering an in-ground utility line, the shroud comprising, consisting essentially of and/or consisting of a body comprising a neck, a base disposed distal from the neck, and a skirt disposed between the base and the neck, a flange extending from the skirt, and a collar disposed between the neck and the skirt, wherein the skirt defines at least a portion of a cavity, wherein the base defines a base opening, wherein the base opening opens into the cavity, wherein the neck defines at least a portion of an access port, wherein the access port opens into the cavity, wherein the body further comprises a plurality of ribs connected to the skirt, wherein the cavity is configured to receive a portion of an in-ground utility line through the base opening, wherein the base is wider than the neck, wherein the neck and the skirt are axially aligned, and, a closure removably connected to the neck to cover the access port. In another aspect, the shroud further can comprise, consist essentially of and/or consist of a marker mounted to the body, wherein the marker can comprise a marker top and a marker base, wherein the marker base is aligned proximal to the base and the marker top is aligned distal to the base. In a further aspect, the marker can be connected to the closure. In still another aspect, the marker can be pivotally mounted to the body. In yet another aspect, the marker can be operably connected to a spring. In yet another aspect, the marker can comprise, consist essentially of and/or consist of an elongated marker body axially aligned with the base of the body.

The present disclosure also encompasses a shroud for covering an in-ground utility line, the shroud comprising, consisting essentially of and/or consisting of a body comprising a base, a skirt extending upward from the base, a flange projecting from the skirt, and a neck connected to the skirt, wherein the skirt defines at least a portion of a cavity within the body, wherein the base defines a base opening in the skirt, wherein the neck defines an access port, wherein the access port and the base opening are in communication with the cavity; and, a marker operably connected to the body, wherein the marker comprises a marker top and a marker base, wherein the marker base is proximal to the base and the marker top is distal from the base, wherein the marker top is alignable in the range of about 0.5 m to about 2.5 m from the base. In another aspect, the marker can be pivotally mounted to the body. In a further aspect, the shroud further can comprise a spring operably connected to the marker. In yet another aspect, the shroud further can comprise a closure removably connected to the neck to cover the access port. In yet another aspect, the marker can be mounted to the closure. In still a further aspect, the neck can comprise a first thread formed thereon and the closure comprises a second thread formed thereon, and wherein the closure is threadably connected to the neck. In still a further aspect, the skirt and the neck can be axially aligned. In another aspect, the body further can comprise a collar disposed between the neck and the skirt, wherein the collar can comprise a collar sidewall and the neck can comprise a neck sidewall, and wherein the collar sidewall is thicker than the neck sidewall. In a further aspect, the shroud further can comprise a metal insert operably connected to the body. In yet another aspect, the marker can comprise an elongated marker body, wherein the marker top can disposed at a first end of the elongated marker body and the marker base is disposed at a second end of the elongated marker body. In yet another aspect, the base can comprise a base width and the skirt can comprise a skirt height, and wherein the ratio of the base width to the skirt height is greater than 1:1. In a further aspect, the marker further can comprise a marker height and the body can comprise a body height, and wherein the ratio of the marker height to the body height is greater than about 2:1.

The present disclosure also encompasses a shroud for covering a portion of utility line, the shroud comprising, consisting essentially of and/or consisting of a body comprising a top, a base and a sidewall disposed between the top and the base, wherein the sidewall defines at least a portion of a cavity disposed within the body, wherein the base defines a base opening therein, wherein the base opening is in communication with the cavity, wherein the cavity is configured to receive at least a portion of a utility line through the base opening, wherein the body defines an access port therein, wherein the access port is in communication with the cavity; and, a marker operably connected to the body, wherein the marker comprises an elongated marker body, wherein the elongated marker body comprises a marker height and wherein the body comprises a body height and wherein the ratio of the marker height to the body height is greater than about 2:1. In one aspect, the base opening comprises a base opening diameter, and wherein the ratio of the base opening diameter to the body height is greater than about 1:1. In another aspect, the marker can be pivotally connected the body. In a further aspect, the shroud further can comprise a spring operably connected to the marker. In yet another aspect, the shroud further can comprise a closure removably connected to the body, wherein the closure covers the access port. In still another aspect, the body further can comprise a neck, wherein at least a portion of the access port is defined by the neck, and wherein the closure is removably connected to the neck. In yet another aspect, the body further can comprise a flange extending from the sidewall. In a further aspect, the body further can comprise a rib connected to both the sidewall and the flange.

The present disclosure also encompasses shroud for covering a portion of utility line, the shroud comprising, consisting essentially of and/or consisting of a body comprising a neck, a collar connected to the neck, a frustoconical skirt depending from the collar, a flange extending outwardly from the frustoconical skirt, a plurality of ribs connected to both the frustoconical skirt and the flange, a base connected to the collar by the frustoconical skirt, wherein the frustoconical skirt defines at least a portion of a cavity in the body, wherein the base defines a base opening therein, wherein the base opening is in communication with the cavity, wherein the cavity is configured to receive at least a portion of a utility line through the base opening, wherein the neck defines an access port, wherein the access port is in communication with the cavity, wherein the neck comprises a first thread formed thereon; a closure comprising a second thread, wherein the closure is threadably connected to the neck of the body, and, a marker pivotally mounted to the body by a mounting assembly, wherein the marker comprises an elongated marker body comprising a marker top and a marker base, wherein the mounting assembly comprises a spring operably connected to the elongated marker body.

The present disclosure also encompasses a method of protecting a portion of a utility line comprising the steps of positioning a shroud over the portion of the utility line, wherein the shroud does not contact the utility line, and wherein the shroud comprises a base with a flange extending therefrom and wherein the flange is disposed on and supported by an aggregate material. The method further comprises the step of aligning a marker connected to the shroud wherein the marker extends upward from grade level. In another aspect, the end of the utility line is disposed within a cavity defined by the body of the shroud. In yet another aspect, the utility line comprises a sewer clean out line. In still a further aspect, the shroud comprises an access port formed in the body. In yet another aspect, the shroud comprises a closure removably connected to the body of the shroud, wherein the closure covers the access port when connected to the body of the shroud. In still a further aspect, the method can include the step of providing the end of a utility line below grade level. In another aspect, the method further can comprise disposing aggregate material over the shroud, wherein the shroud is at least partially covered by the aggregate material.

These and other aspects of the present disclosure are set forth in greater detail below and in the drawings for which a brief description is provided as follows.

DETAILED DESCRIPTION

The present disclosure encompasses devices that can be used to protect temporarily portions of in-ground utility lines from damage from above ground equipment and/or to identify the location of such lines. The shrouds described herein can be used to cover and/or identify in-ground utility lines, such as clean out lines for a sewer line, meters for water lines, in-ground electrical lines, sewer lines, fiber optic cables, water lines, fuel pipe lines, chemical pipe lines, and other such in-ground utility lines. The shrouds encompassed by the present disclosure can provide temporary or permanent protection and/or identification of particularly utility lines as necessary, such as during the construction phase of a new construction or renovations of existing construction. Wherever possible, the application uses the same reference numbers throughout the drawings to refer to the same or similar items.

As used herein, the singular forms of "a," "an," and "the" encompasses the plural form thereof unless otherwise indicated. As used herein, the phrase "at least one" includes all numbers of one and greater. As used herein, the term "removably connected" encompasses configurations of elements such that one element or portion thereof optionally can be connected to and disconnected from another element in the normal course of use of the elements. As used herein, the term "operably connected" encompasses configurations of elements wherein one element is connected directly and/or indirectly to another element so as to allow the two elements to function in the intended fashion within the apparatus. As used herein, the term "in communication" encompasses direct and/or indirect opening or passage between one element and another element during at least some time periods during use. As used herein, the term "grade level" refers to the top surface of the ground adjacent the relevant structures referenced in the present disclosure. As used herein, the term "aggregate material" refers to soil, gravel, rock, sand or similar particulate material that, when combined, can form a support surface.

Figure 1:
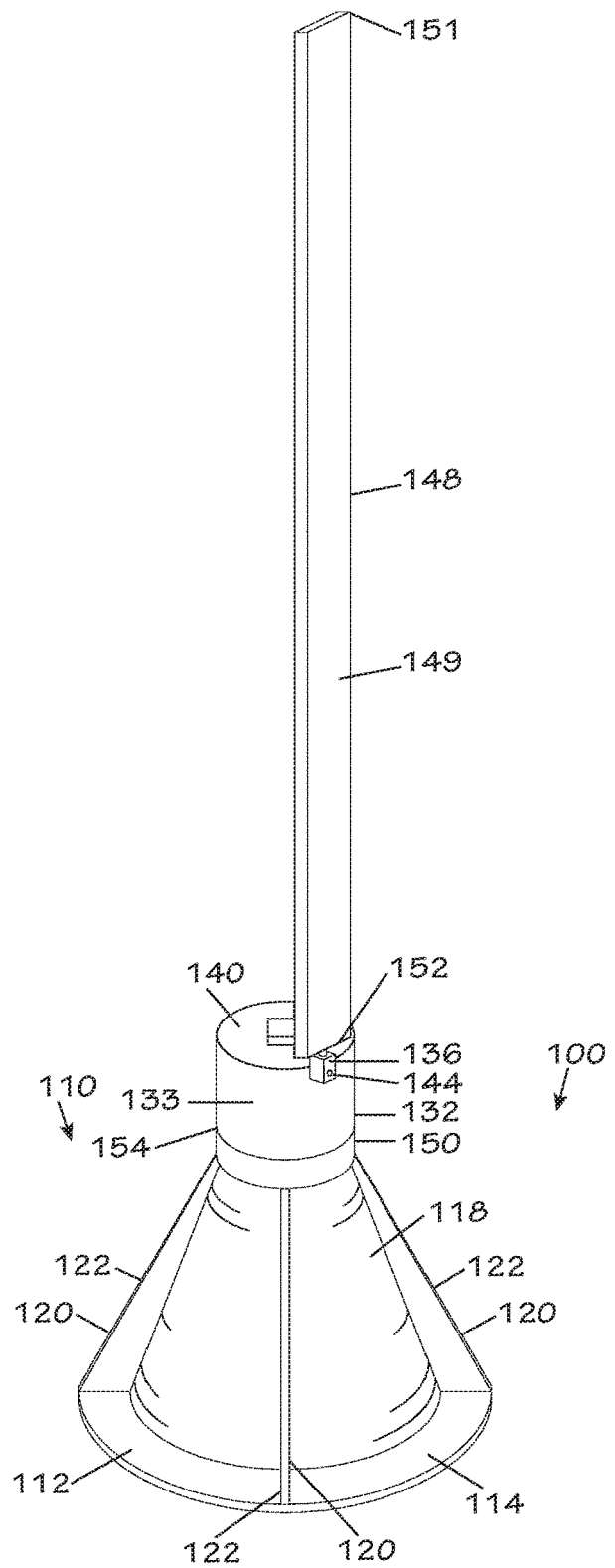
FIG. 1 is a perspective view of a shroud for covering a portion of a utility line, wherein the shroud encompasses aspects of the present disclosure.
Figure 4:
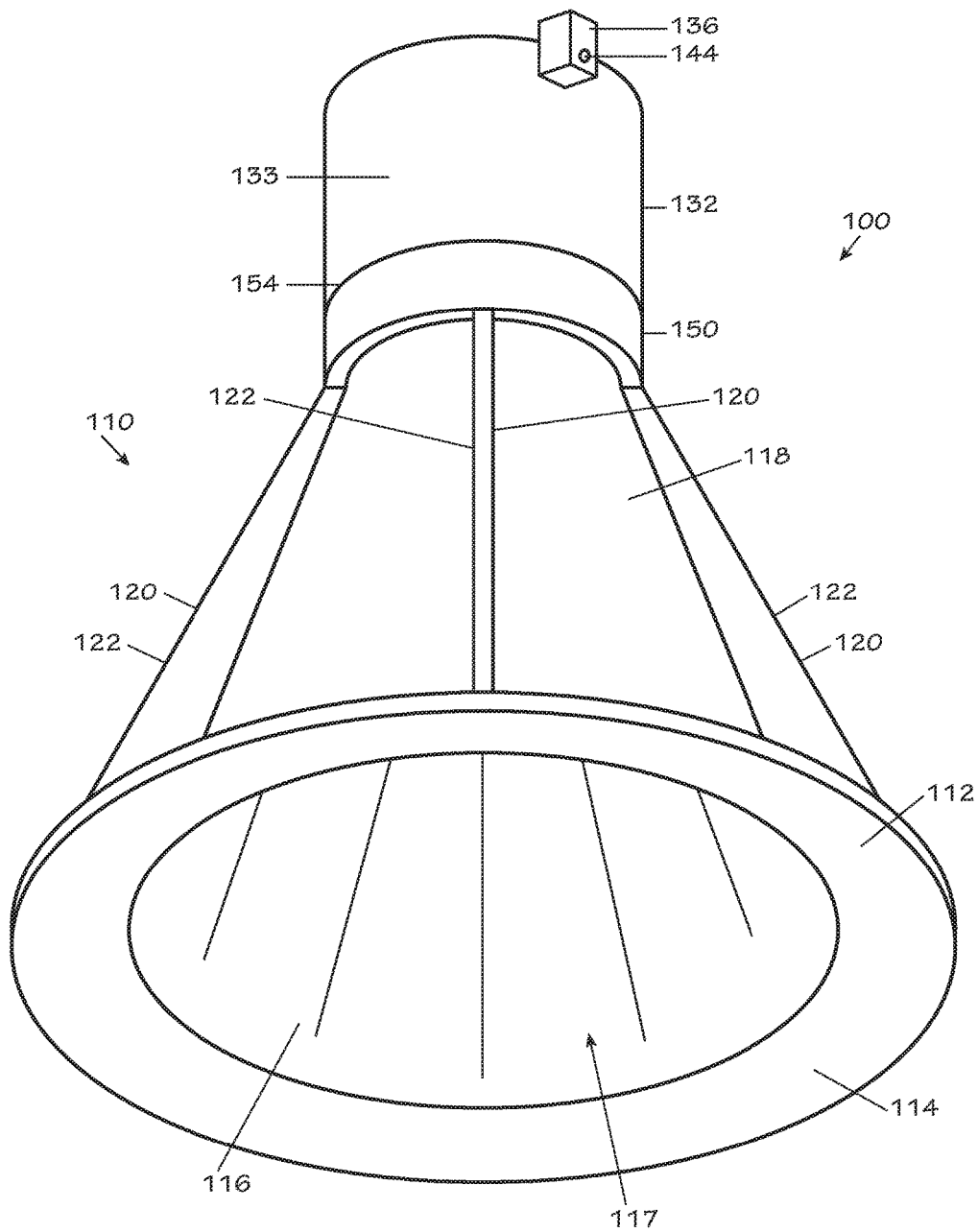
FIG. 4 is another perspective view of the shroud as shown in FIG. 2.
Figure 5:
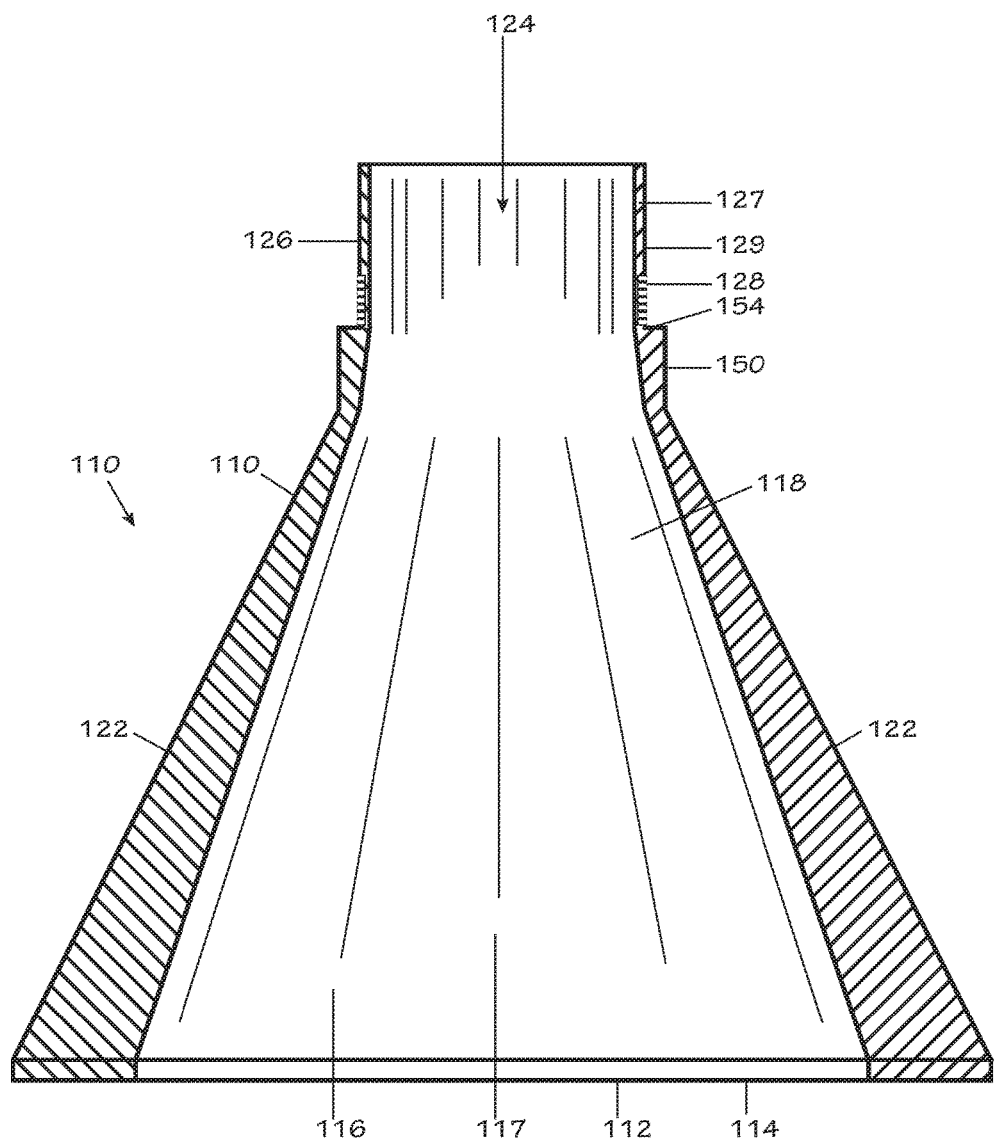
FIG. 5 is a cross sectional view of the body of the shroud shown in FIG. 1 with the closure and marker removed.
Figure 6:
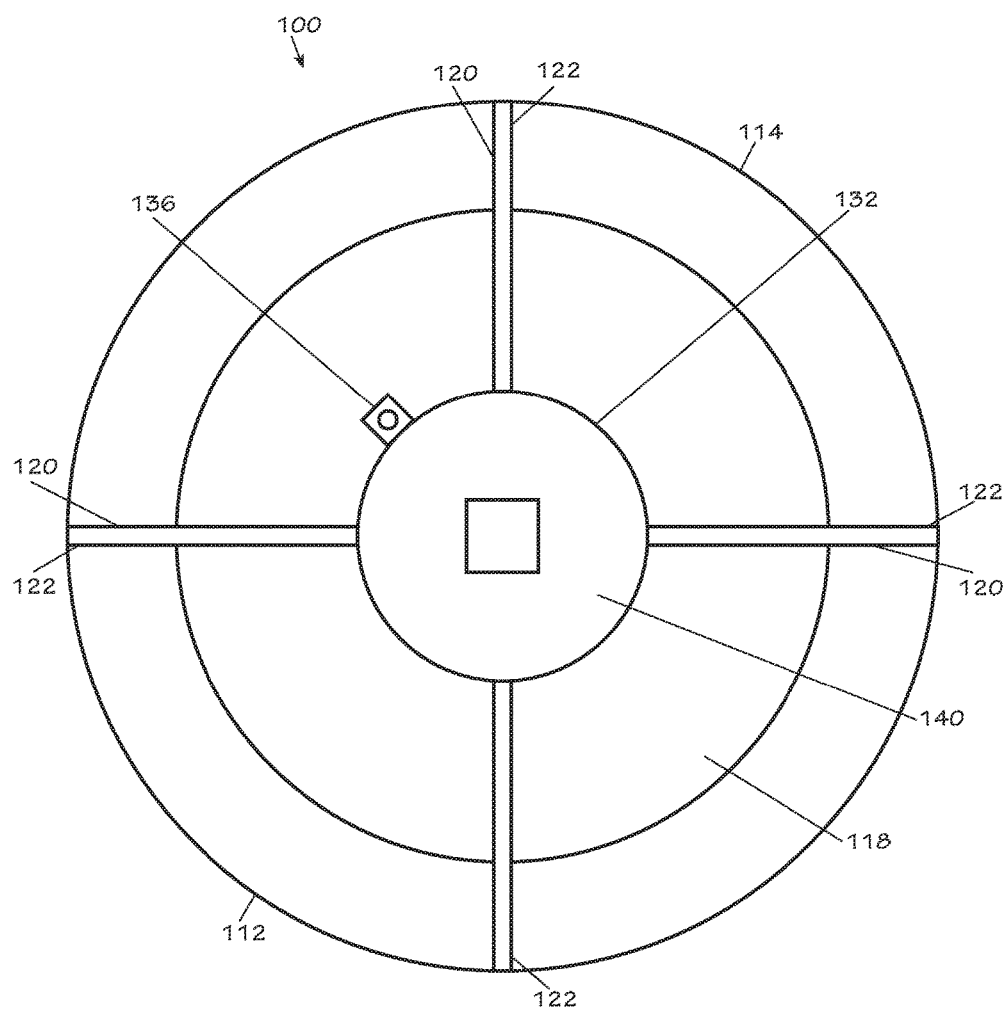
FIG. 6 is a top plan view of the shroud as shown in FIG. 2.
Figure 7:
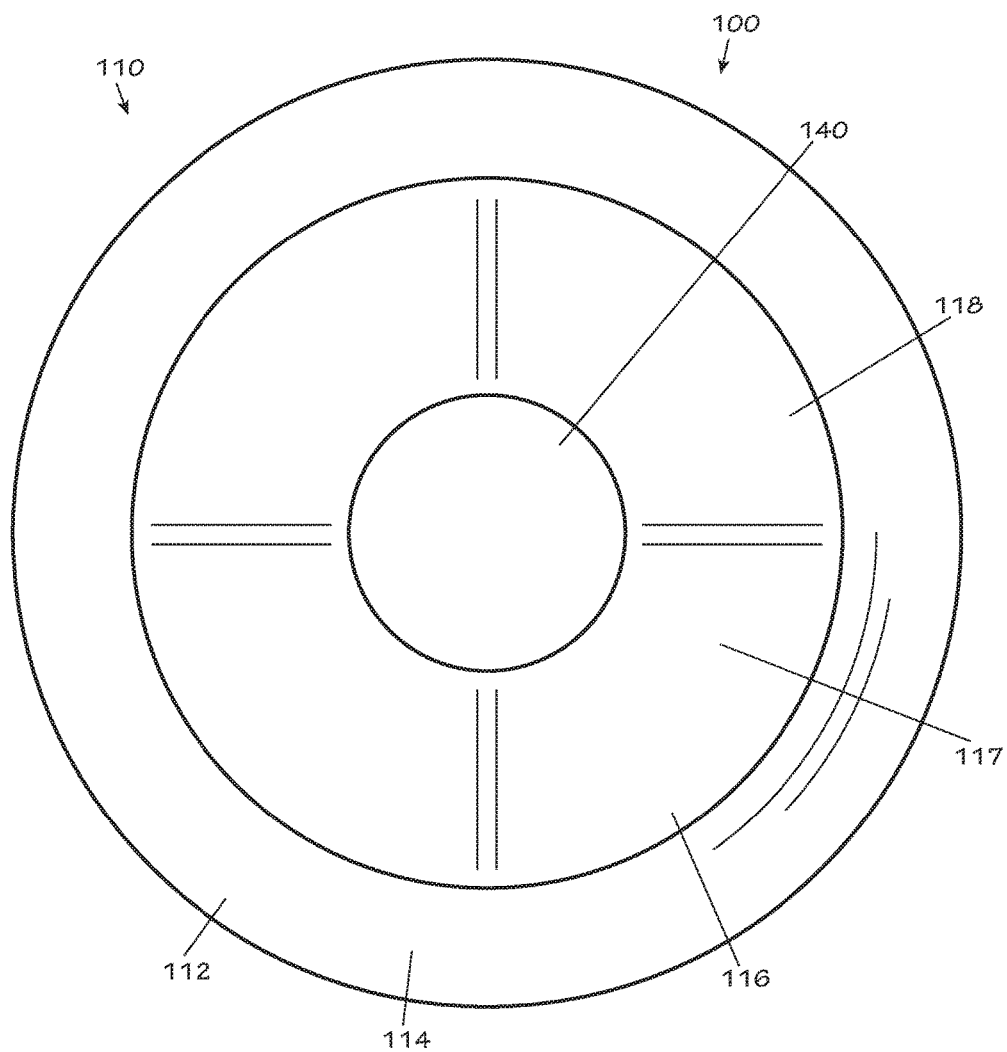
FIG. 7 is a bottom plan view of the shroud of FIG. 1.

FIGS. 1-9 illustrate an embodiment of a shroud 100 encompassing aspects of the present disclosure. As shown in FIG. 1, the shroud 100 includes a body 110 to which is attached a closure 132. Operably connected to the body 110 is a marker 148, which, as shown in FIG. 1, can be operably connected to the body 110 via attachment to the closure 132. The body 110, as shown in FIGS. 5 and 7, can be radially symmetrical and configured to fit over a portion of a utility line, such as the end of a clean out pipe of a sewer line. The closure 132 is removably connected to the body 110 and covers an access port 124 formed in the neck 126 of the body 110 and aligned to allow access to a portion of a utility line 160 over which the body 110 is disposed. The closure 132 includes a top wall 140 and a sidewall 133 that can be disposed over the neck 126 of the body 110.

The marker 148 comprises an elongated marker body 149 having a marker top 151 and an opposed marker base 152. The marker 148 is configured to be operably connected to the body 110 and extend upward therefrom so as to be visible above ground in order to allow for the identification of the location and/or the type of utility line that is being protected by the shroud 100. In one aspect, the elongated marker body 149 can exhibit a length in the range of about 0.5 m to about 2.5 m. In another aspect, the elongated marker body 149 can exhibit a length in the range of about 0.75 m to about 2 m. In yet another aspect, the elongated marker body 149 can exhibit a length of approximately 1.5 m, thereby allowing the marker 148 to be visible at both extended distances from the shroud 100 and near the shroud 100 when viewed from an elevated position, such as the cab of a vehicle. The marker 148 can have indicia formed thereon identifying the particular utility line, lot, unit, or company responsible for the installation or construction. While the marker 148 shown in FIG. 1 is shown as a rectangular placard, the markers encompassed by the present disclosure can include markers of various sizes, shapes and configurations, such as the elongated body 149 comprising a telescoping portion.

In one aspect, the body 110 of the shroud 100 can exhibit a total height, excluding the marker, in the range of about 0.4 m to about 1 m. In another aspect, the body 110 can exhibit a total height in the range of about 0.5 m to about 0.8 m. In yet another aspect, the body 110 can be about 0.6 m in height. In one aspect, the shroud 100 can exhibit a ratio of the height of the marker 148 to the height of the body 110 greater than about 2:1, and, more specifically, about 2.5:1.

Figure 2:
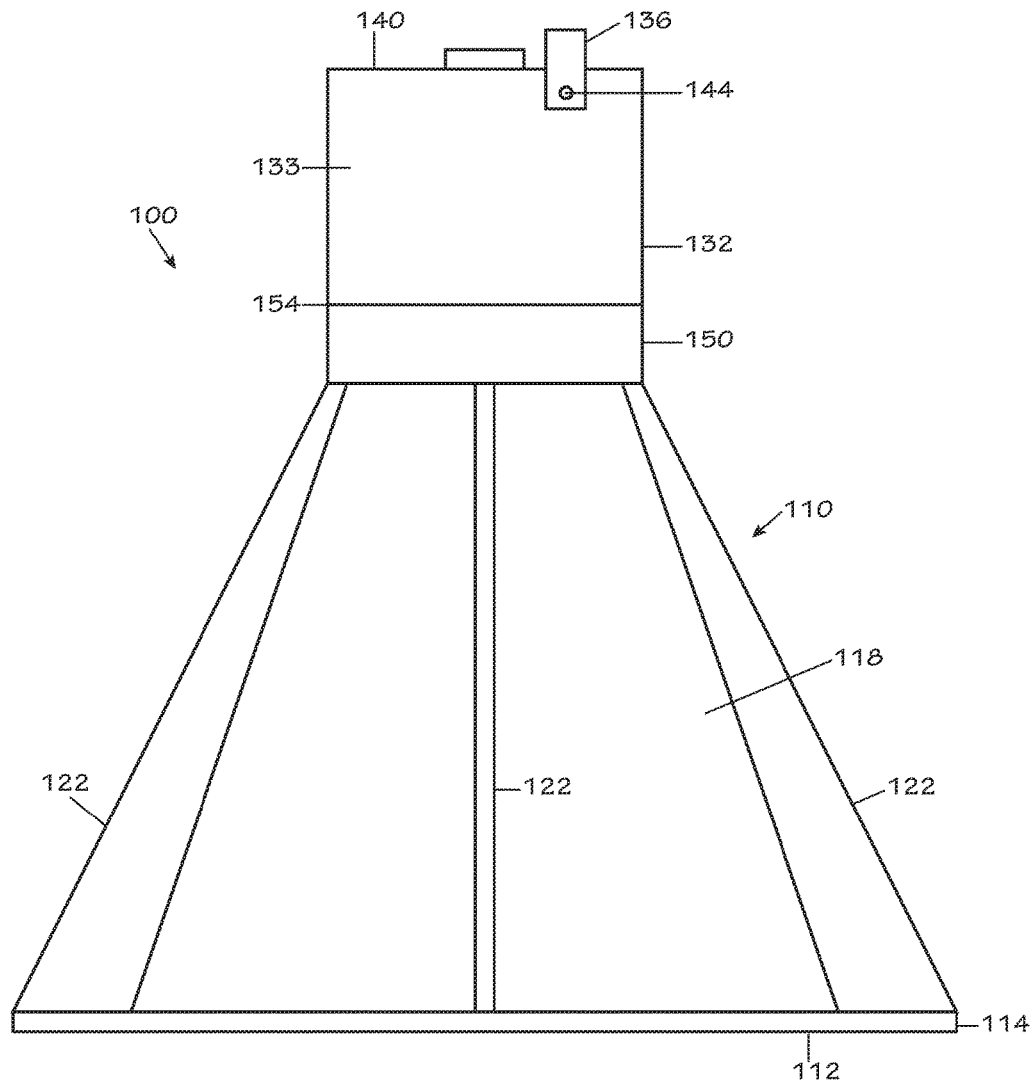
FIG. 2 is a side elevation view of the shroud of FIG. 1 with the marker removed.
Figure 3:
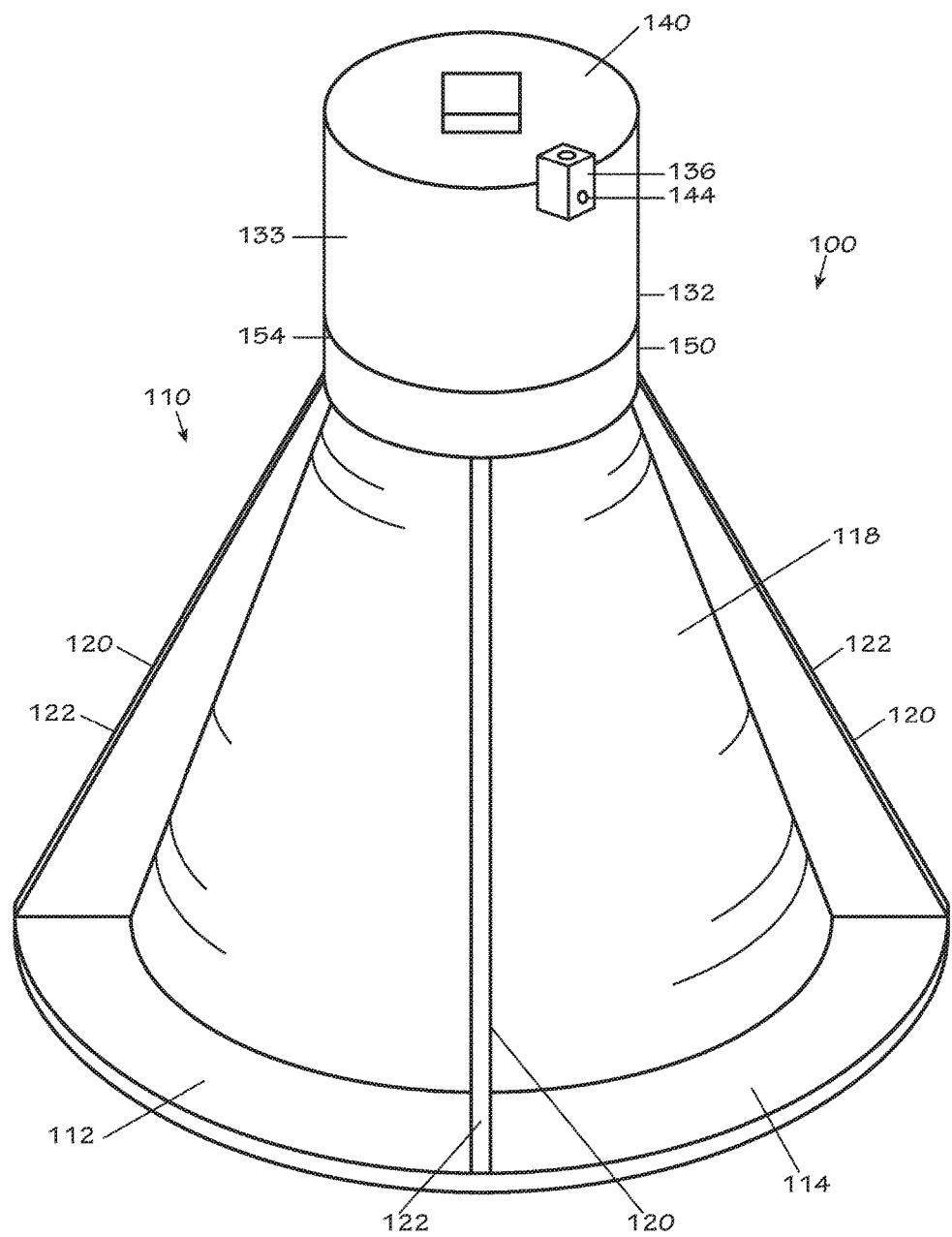
FIG. 3 is a perspective view of the shroud as shown in FIG. 2.

FIG. 2 illustrates the shroud 100 as shown in FIG. 1, but with the marker 148 removed. The shroud 100 includes the closure 132 disposed on and removably attached to a centrally aligned neck 126, shown in FIG. 5, formed on the body 110 of the shroud 100. Attached by a fastener 144 to the closure 132 is a connector 136 to which can be mounted the marker 148. The connector 136 can be pivotally mounted on either the closure 132, or, alternatively, the body 110 to allow for the connector and marker 148 to move pivotally in relation to the body 110. Also, as another alternative, the marker 148 can be pivotally mounted on the connector 136 to allow for the movement of the marker 148 relative to the connector 136 and the body 110 of the shroud 100. The fastener 144 can be a screw, pin or other type of fastener that can secure the connector 136 to the rest of the shroud 100. The closure 132 includes a closure sidewall 133 that extends downward over and partially encompasses a portion of the neck 126 of the body 110.

As shown in FIGS. 2-5, a collar 150 is formed on the body 110 between the skirt 118 and at least a portion of the body 110. A shoulder depending from a portion of the neck 126 is formed on the collar 150. When the closure 132 is disposed on the body 110, the collar 150 is aligned between the closure 132 and the skirt 118. The collar 150 includes a collar sidewall 154 that exhibits a thickness greater than the thickness of the neck sidewall 127. The body 110 of the shroud 100 includes a skirt 118 extending around at least a majority of the body 110. Along the skirt 118 are disposed one or more supports 120 that reinforce the skirt 118 to allow the body 110 of the shroud 100 to withstand compressive and shear forces applied thereto. The supports 120 can take the form of ribs 122 extending at least a portion of the distance between the collar 150 and a base 114 of the body 110. Each rib 122 is shown extending outwardly from the skirt 118 and of trapezoidal configuration with the base of the rib 122 being wider than the top of the rib 122. Each rib 122 is attached to a flange 112 that extends outwardly from the skirt 118. Each rib 122 can form an angle of approximately 90° with the flange 112. Other configurations of one or more supports 120 can be provided on the body 110 to reinforce the body 110 against forces applied thereto, whether by soil applied there over or equipment striking or running over the body 110.

As shown in FIGS. 3-8, the skirt 118 depends from the collar 150 and extends to the base 114 of the body 110. The skirt 118 can be frustoconical with the bottom portion of the skirt 118 having a diameter that is larger than the diameter of the top portion of the skirt 118. The supports 120 project outwardly from the skirt 118 and extend between the collar 150 and the flange 112. The skirt 118 terminates at the base 114 of the body 110, with the flange 112 defining at least a portion of the base 114. The flange 112 is aligned with the skirt 118 to form an outer angle of greater than about 90°.

As shown in FIG. 4, the body 110 includes a concave portion with a base opening 116 formed in the base 114 of the body 110. As shown in FIG. 5, the sidewall of the body 110 that comprises the skirt 118 defines, at least in part, a cavity 117 that is in communication with the base opening 116. As shown in FIG. 5, the cavity 117 is in communication with both the base opening 116 and the interior of the neck 126 and access port 124, wherein the cavity 117 is disposed between the base opening 116 and the access port 124. The cavity 117 is configured to receive a portion of a utility line therein, such as the end of a clean out line of a sewer 160. The cavity 117 can be configured such that the base opening 116 and the skirt 118 are wide enough to clear the top of the utility line 160 if the shroud 110 is tipped over so as to avoid damaging the utility line 160. In one aspect, the ratio of the width of the cavity 117 at the base 114 to the height of the cavity 117 is sufficient to allow for the shroud 100 to be tipped over without striking the utility line 160 situated therein. For example, the ratio of the width of base opening 116 to the height of the cavity 117 can be greater than 1:1.

As shown in FIG. 5, the body 110 of the shroud 100 includes the access port 124 formed in the neck 126. The neck 126 is defined by the neck sidewall 127 and is open to the cavity 117 defined by the skirt 118 and the base 114. The open neck 126 allows for access through access port 124 to the interior of cavity 117 when the shroud 100 is installed over a clean out line or other utility line. The access port 124, neck 126, cavity 117, skirt 118, base opening 116, and base 114 can all be axially aligned, as shown in FIG. 5, and with the closure 132 also axially aligned with these body components when the closure 132 is attached to the neck 126. The axial alignment of these parts of the shroud 100 allow for access to the interior of the body 110 and distribution of weight and/or compressive force to the base 114 of the body 110. The present disclosure also encompasses shrouds that include parts that are not axially aligned. The collar sidewall 154 has a thickness that is greater than the thickness of the neck sidewall 127 so as to provide strength and resistance to compressive and shear forces applied to the body 110 and form an abutment to resist downward pressure on the closure 132. A shoulder depends from the neck sidewall 127 and defines at least a portion of the collar 150. The collar 150 can extend around the entire circumference of the neck 126 or a portion thereof. The collar 150 includes a ledge extending outwardly from the neck sidewall 127. The ledge 154 can form a seat on which the bottom of the closure sidewall 133 is disposed when the closure 132 is threadably attached to the neck 126. The seat provides a contact surface through which the collar 150 can resist downward pressure on the closure 132. The outer diameter of the neck sidewall and corresponding threads can be sized to receive an eight-inch (0.2 m) diameter closure. The eight-inch closure can be the same type closure used to close a clean out line, such as, for example, a cast iron or brass closure. With the neck 126 sized to accommodate such a closure, the shroud 100 can be installed in ground permanently to cover a clean out line or other type of utility line.

Figure 8:
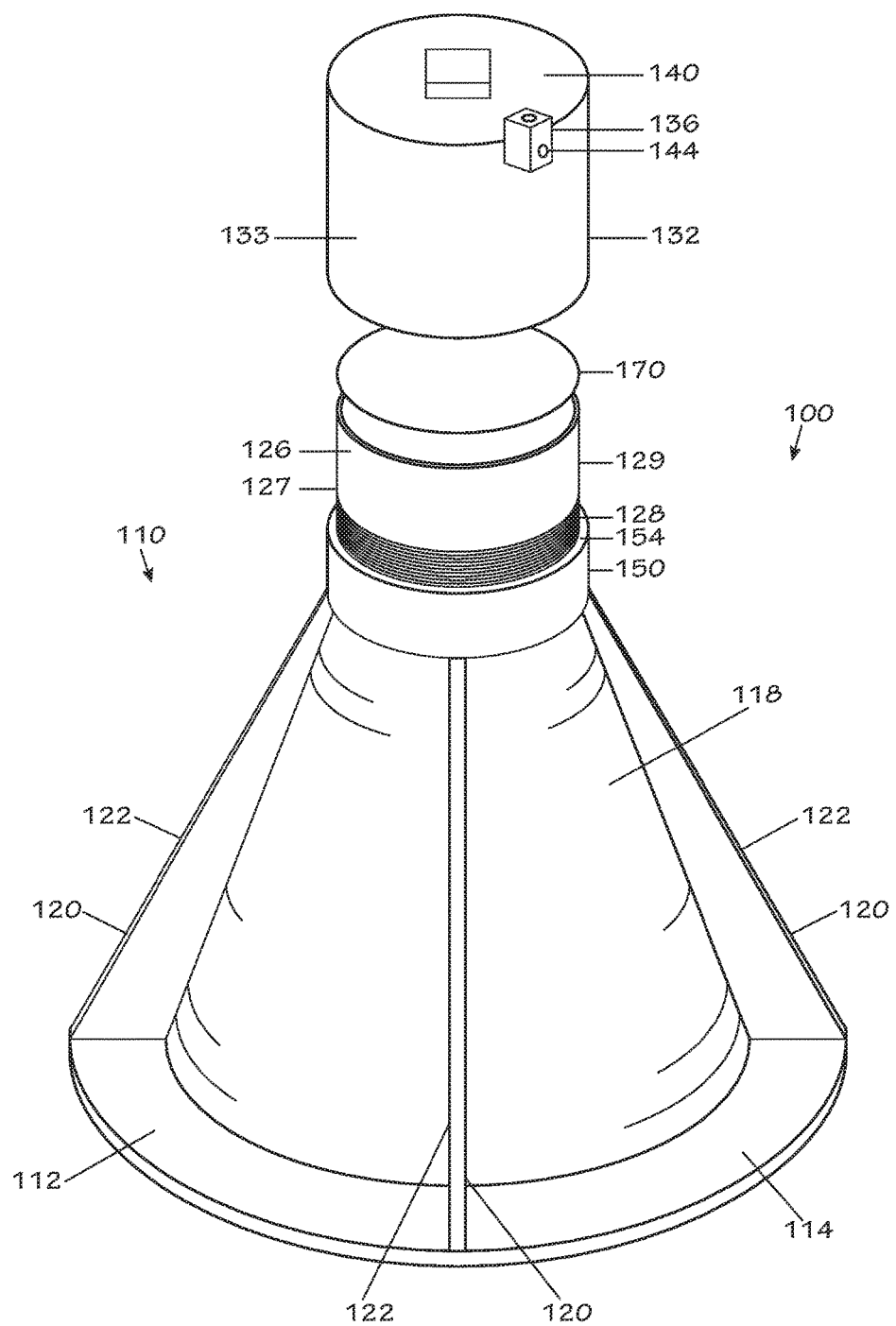
FIG. 8 is an exploded perspective view of the shroud shown in FIG. 2.

As shown in FIG. 6, a plurality of supports 120 can be disposed around the body 110 to reinforce the skirt 118 and the flange 112. Four supports 120 are shown in FIG. 6 disposed at 90° intervals around the skirt 118. The supports 120 can take the form of ribs 122 that have straight sides and extend from the neck 126 to the outer edge of the base 114. As shown in FIGS. 5 and 8, the depth of the ribs 122, as measured from the adjacent surface of the skirt 118 can vary along the height of the body 110, with the largest depth of the ribs 122 being at the base 114 of the body 110 and the smallest depth being at the top of the skirt 118. The slope of the top edge of each rib 122 is greater than the slope of the skirt 118 as measured from an axis extending through the center of the body 110. The present disclosure encompasses shrouds that include varying numbers and configurations of supports 120 that can provide added strength to the bodies of the shrouds.

As shown in FIG. 7, the top wall 140 of the closure 132, when the closure 132 is attached to the neck 126, can be axially aligned with the neck 126, the skirt 118, the cavity 117 and the flange 112. The flange 112 can be circular, as shown in FIG. 7, or of another suitable configuration to provide for the distribution of forces placed on the body 110. The flange 112 is provided in the form of a ring that extends outwardly from the skirt 118 and includes a flat lower face that can serve as a footing for the shroud 100 to allow for increased contact with the ground beneath the base 114 of the body 110. The present disclosure also encompasses shrouds that have flanges that extend inwardly from the base of the body of the shroud and/or flanges that extend from the skirt and/or concave section of the body at one or more intermediate alignments between the top and base of the body of the shroud.

As shown in FIG. 8, the closure 132 includes a top wall 140 and a sidewall 133 to which is attached the connector 136. The connector 136 is attached to the closure 132 by the fastener 144 and can be pivotally mounted to the closure 132 to allow movement of the marker 148 attached to the marker connector 136. When the closure 132 is connected to the body 110 of the shroud 100, the closure 132 is fitted over the neck sidewall 127. The closure 132 includes a thread, not shown, formed on the interior of the closure sidewall 133, that can be engaged to a thread 128 formed on the exterior of the neck sidewall 127. The neck sidewall 127 includes a non-threaded portion 129 disposed distally from the skirt 118, and which can reinforce the closure 132, when connected to the neck 126, against shear forces applied to the closure 132, such as when equipment or a vehicle runs over the closure 132, thereby reducing the likelihood that the closure 132 would be broken off from the body 110 of the shroud 100 when subjected to such a force. The shroud 100 also can include a metal insert 170 operably connected to the body 110, so that the metal insert 170 can be used to aid in the location of the shroud 100 with a metal detector if the shroud 100 is completely buried or otherwise not easily visible. While the insert 170 is shown in FIG. 8 as a solid disk of metal, the insert 170 can be formed into various shapes suitable for integration into the shroud 100.

Figure 9:
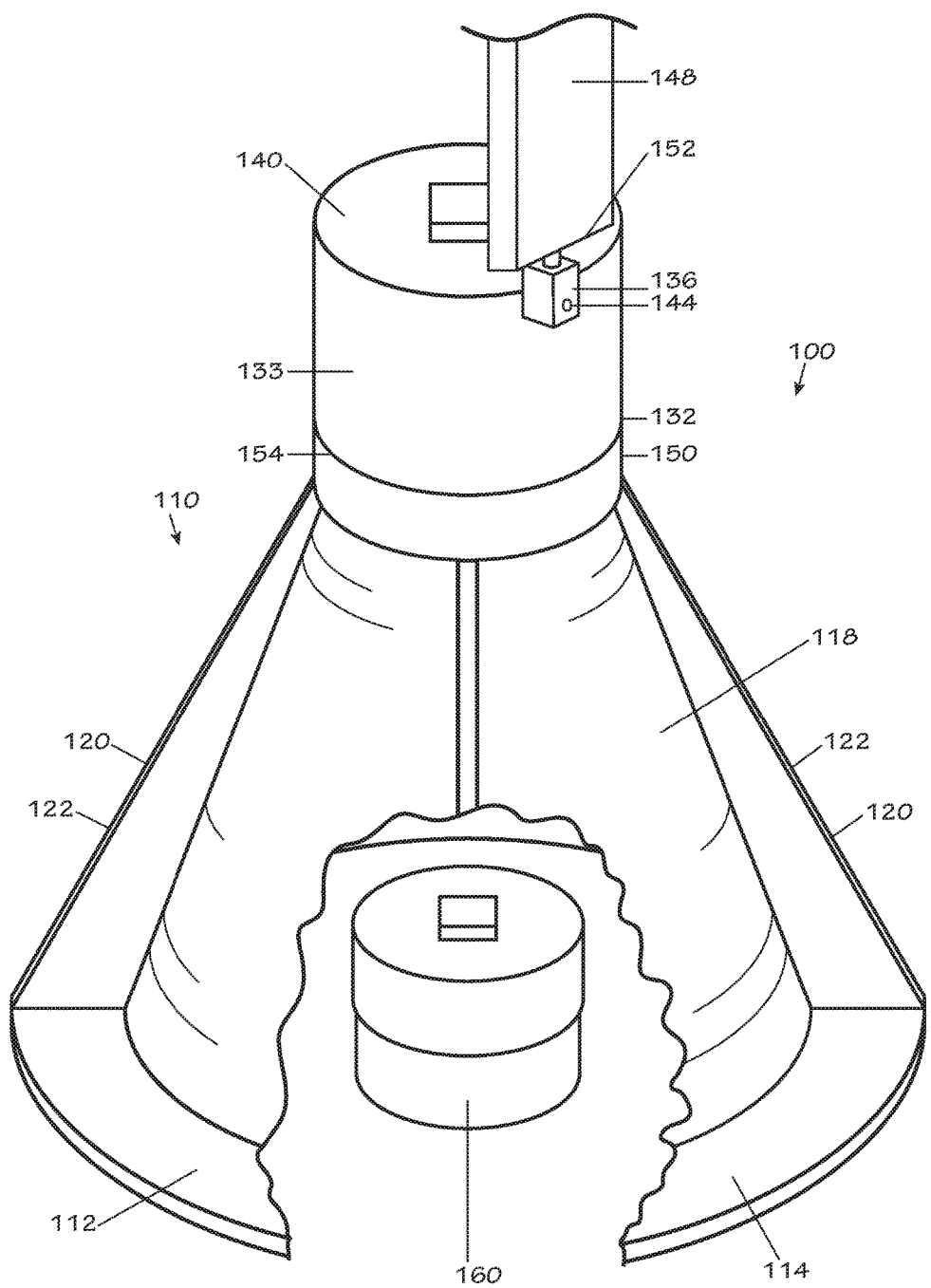
FIG. 9 is a partial cutaway perspective view of the shroud shown in FIG. 1 installed in ground over a sewer clean out line with a portion of the marker not shown.

As shown in FIG. 9, the shroud 100 can be placed over the end of a utility line 160, which can be a sewer clean out line or other utility line as described herein or known in the art, so that the end of the utility line 160 projects through the base opening 116 into and is disposed within the cavity 117. The base 114 extends around the utility line 160 and rests on aggregate material, such as soil, rock, sand, gravel or the like. With the aggregate material enclosing the base opening 116 formed in the base 114, the cavity 117 is closed from the bottom. The shroud 100 is aligned over the utility line 160 so that access to the utility line 160 is available through the access port 124 in the neck 126 of the body 110, when the closure 132 is removed from the neck 126.

In one alternative method of covering the utility line 160, the shroud 100 rests on top of the ground above grade level. In this method, the shroud 100 is aligned such that the marker 148 extends upward from the location of the utility line 160, so that the shroud 100 is readily visible to those that might be operating equipment and vehicles in the vicinity of the utility line 160. If the shroud 100 is run over or struck by a piece of equipment or a vehicle, the shroud 100 will resist the force and/or tend to topple over; but due to the width of the base opening 116 relative to the height of the utility line 160, the body 110 of the shroud 100 will tend to clear the utility line 160 without striking the line, thereby reducing the likelihood of damage to the utility line 160. Alternatively, after the shroud 100 is aligned over the utility line 160, such that a portion of the utility line 160 is disposed within the cavity 117 of the body 110 of the shroud, the shroud 100 can be at least partially covered with soil, gravel, or other suitable material. In one particular aspect, the end of the utility line 160 can be arranged such that it is below grade level in a hole. After the shroud 100 is placed over the utility line 160, the hole can be at least partially filled in to at or near grade level. In such an arrangement, all or part of the neck 126 can extend above grade level, or, alternatively, all of the shroud 100, except for the marker 148, can be disposed below grade level. With the marker 148 extending upward above grade level, the location of the utility line 160 can be prominently identified. The configuration and/or the materials of construction of the body 110 of the shroud 100 are such that if a piece of equipment or vehicle is run over the shroud 100 the compressive force applied to the shroud 100 is dispersed across the body 110 of the shroud 100 to the flange 112 and to the ground upon which the flange 112 rests, instead of directly to the utility line 160, thereby reducing the probability that the utility line 160 is damaged during such an event.

Figure 10:
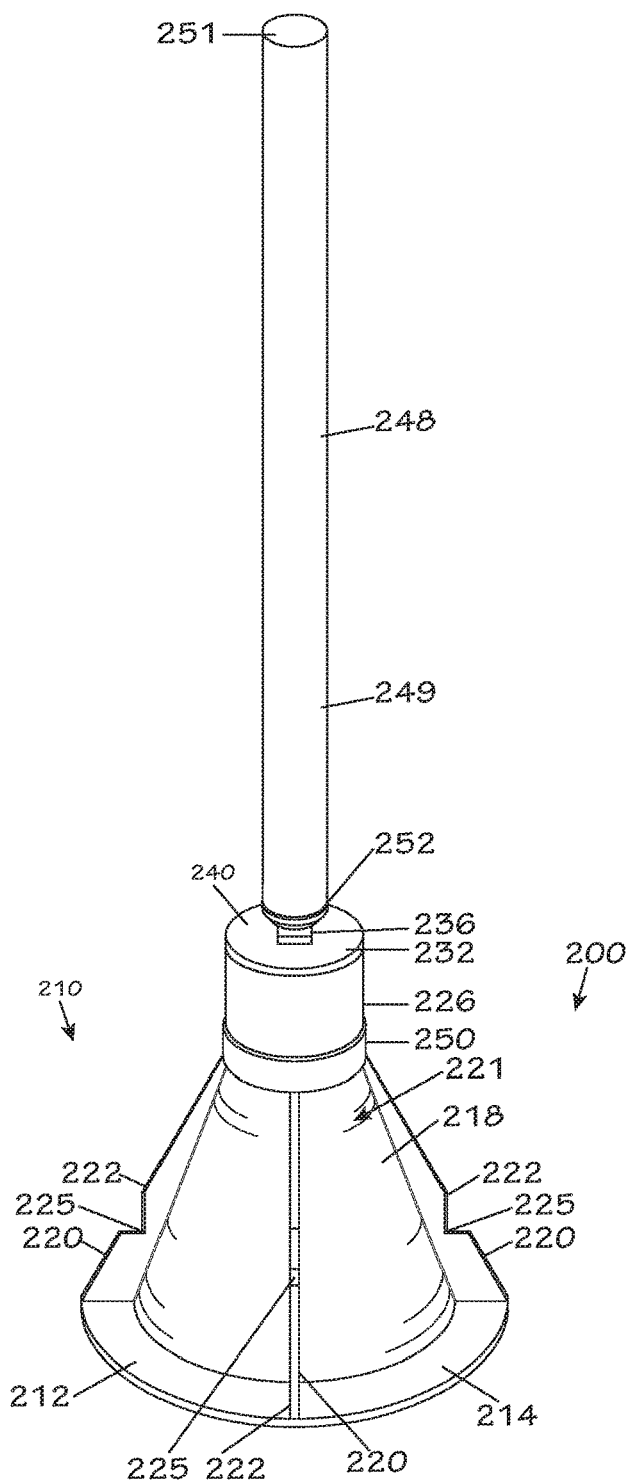
FIG. 10 is a perspective view of another shroud encompassing aspects of the present disclosure.

FIGS. 10-19 illustrate another embodiment of a shroud 200 encompassing aspects of the present disclosure. As shown in FIG. 10, the shroud 200 includes a body 210 to which is removably attached a closure 232. Operably mounted to the body 210 is a marker 248 that is pivotally mounted to the closure 232. The body 210 is radially symmetrical and configured to fit over a utility line 160. The body 210 includes a top that is distal to a base 214 and a sidewall 221 extending upward from the base 214 and that, in part, defines a concave portion that forms a cavity 217.

Figure 11:
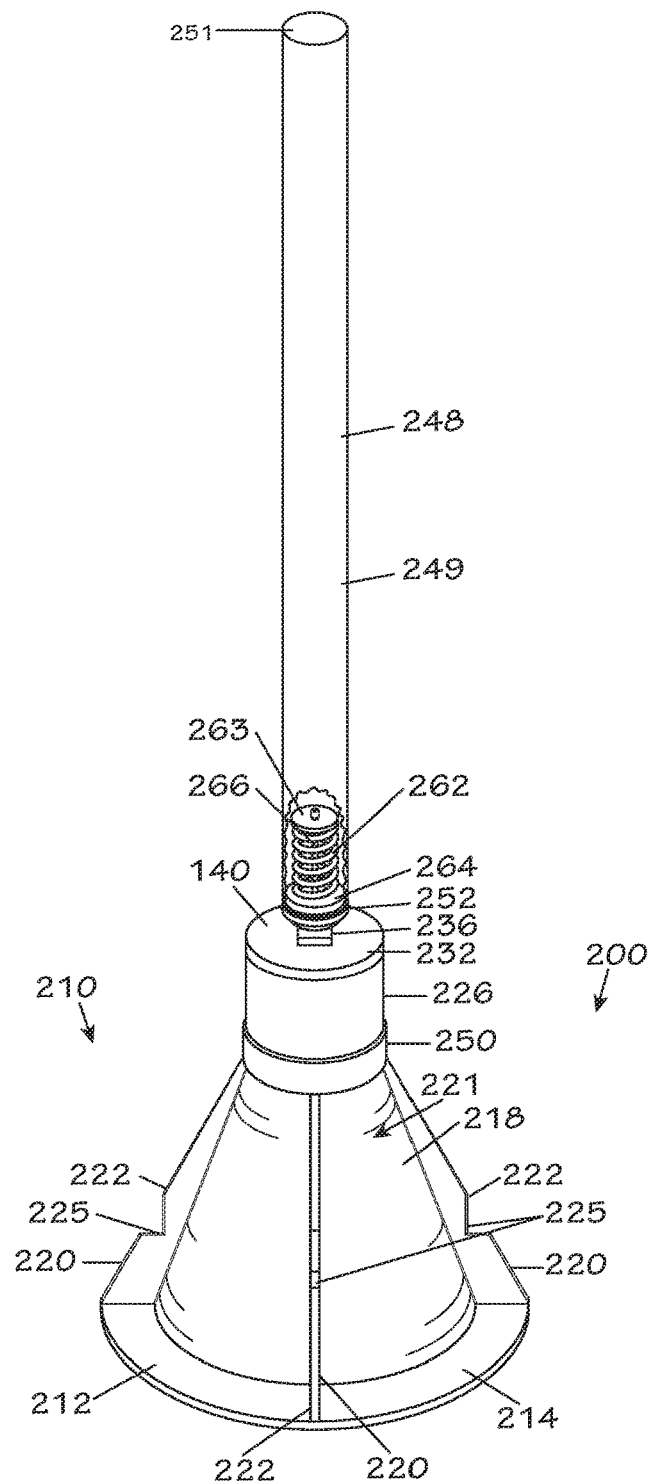
FIG. 11 is a partial cutaway perspective view of the shroud shown in FIG. 10 with a portion of the marker body cutaway.
Figure 18:
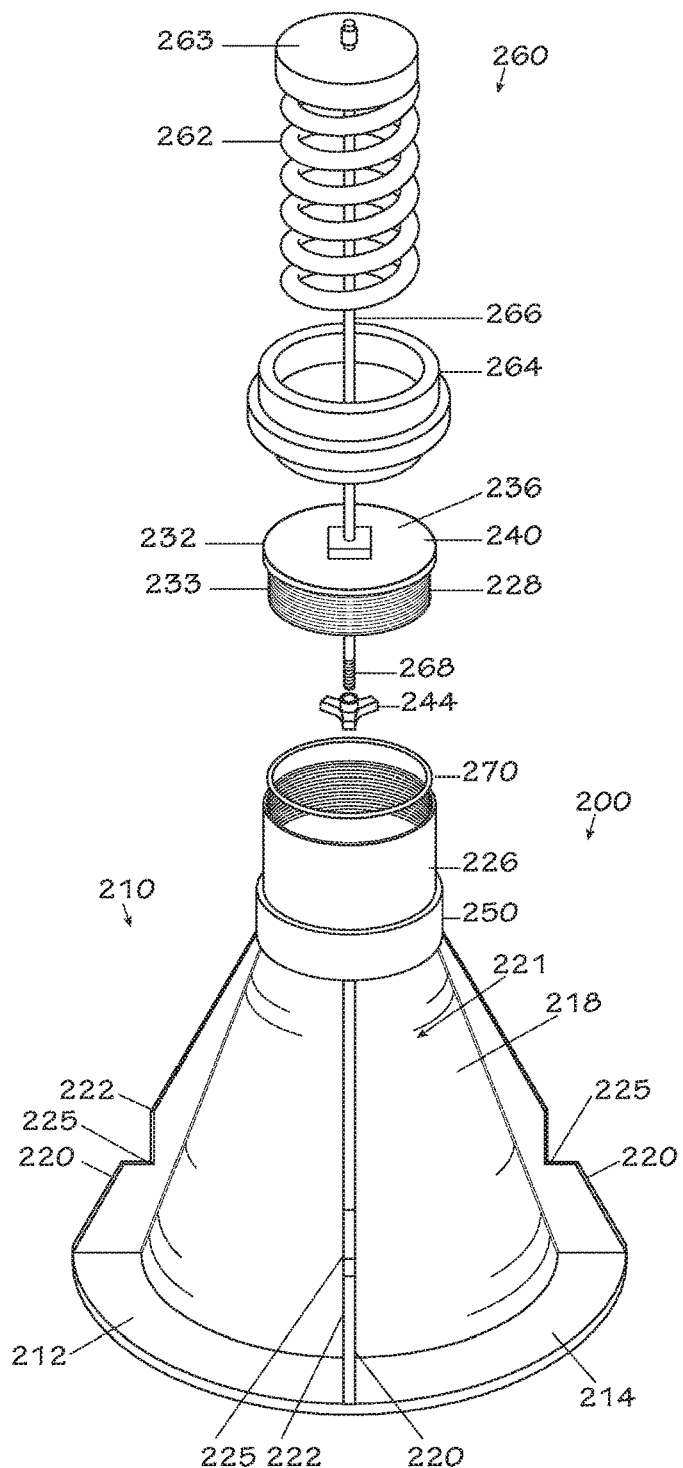
FIG. 18 is an exploded perspective view of the shroud shown in FIG. 10 with the marker body removed.

As shown in FIGS. 10, 11 and 18, the marker 248 is configured to extend upward from the body 110 of the shroud 100 and be visible above ground so as to allow for the identification of the location and type of utility line that is being protected by the shroud 200. The marker 248 comprises a tubular elongated marker body 249 that includes a marker top 251 and a marker base 252 and that is pivotally mounted to the closure 232. Relative to the marker top 251, the marker base 252 is aligned proximal to the base 214 of the body 210, whereas the marker top 251 is aligned distal from the base 214. The marker 248 is axially aligned with the closure 232 and the body 110 of the shroud 100. The marker 248 comprises a mounting assembly 260 that includes a connector 236 attached to the closure 232, a marker collar 264 to which is attached the elongated marker body 249, a spring 262 to which is mounted the marker collar 264, and a cable 266, which is connected to the spring 262 by cable plate 263. The cable 266 connects the rest of the mounting assembly to the connector 236. The elongated marker body 249 is attached to the marker collar 264 at or adjacent to the marker base 252. The elongated marker body 249 is otherwise unattached to the remainder of the shroud 100 and is connected to the remainder of the shroud 100 via the attachment to the marker collar 264. At least a portion of the marker collar 264 is disposed between the marker base 252 and the connector 236 and/or within the elongated marker body 249. The marker collar 264 is mounted to a spring 262 and is unattached to the rest of the shroud 100. The spring 262 is axially aligned with the elongated marker body 249 and is attached to the cable plate 263 that is mounted on the cable 266 that extends through and is axially aligned with the spring 262. The spring 262 is biased in an open configuration and in a direction axial with the axis of the elongated marker body 249. The cable 266 is axially aligned with the elongated marker body 249 and extends through the spring 262 and through the connector 236 and is fixedly mounted to the connector 236 via the fastener 244, which can be threadably engaged to a thread 268 formed in one end of the cable 266. The fastener 244 can take the form of a nut, such as a wing nut, as shown in FIG. 18.

As shown in FIG. 10, the elongated marker body 249 is aligned generally perpendicular to the base 214 of the body 210 of the shroud 200. The tension of the cable 266 maintains the alignment of the elongated marker body 249. When force is applied to the elongated marker body 249, the body 249 will pivot about the point where the cable extends through the connector 236 and move out of perpendicular alignment with the base 214 of the body 210. Movement of the elongated marker body 249 will cause the marker collar 264 to resist the biasing force of the spring 262 and move upward against the spring 262. The spring 262 continuously applies pressure to the marker collar 264 and is anchored by attachment to the cable 266. When the applied force is removed from the elongated marker body 249, the elongated marker body 249 ceases to transmit that force to the marker collar 264; in turn, the spring 262 biases the marker collar 264 back to the starting position, thereby repositioning the elongated marker body 249 in the original alignment generally perpendicular to the base 214 of the body 210.

Figure 12:
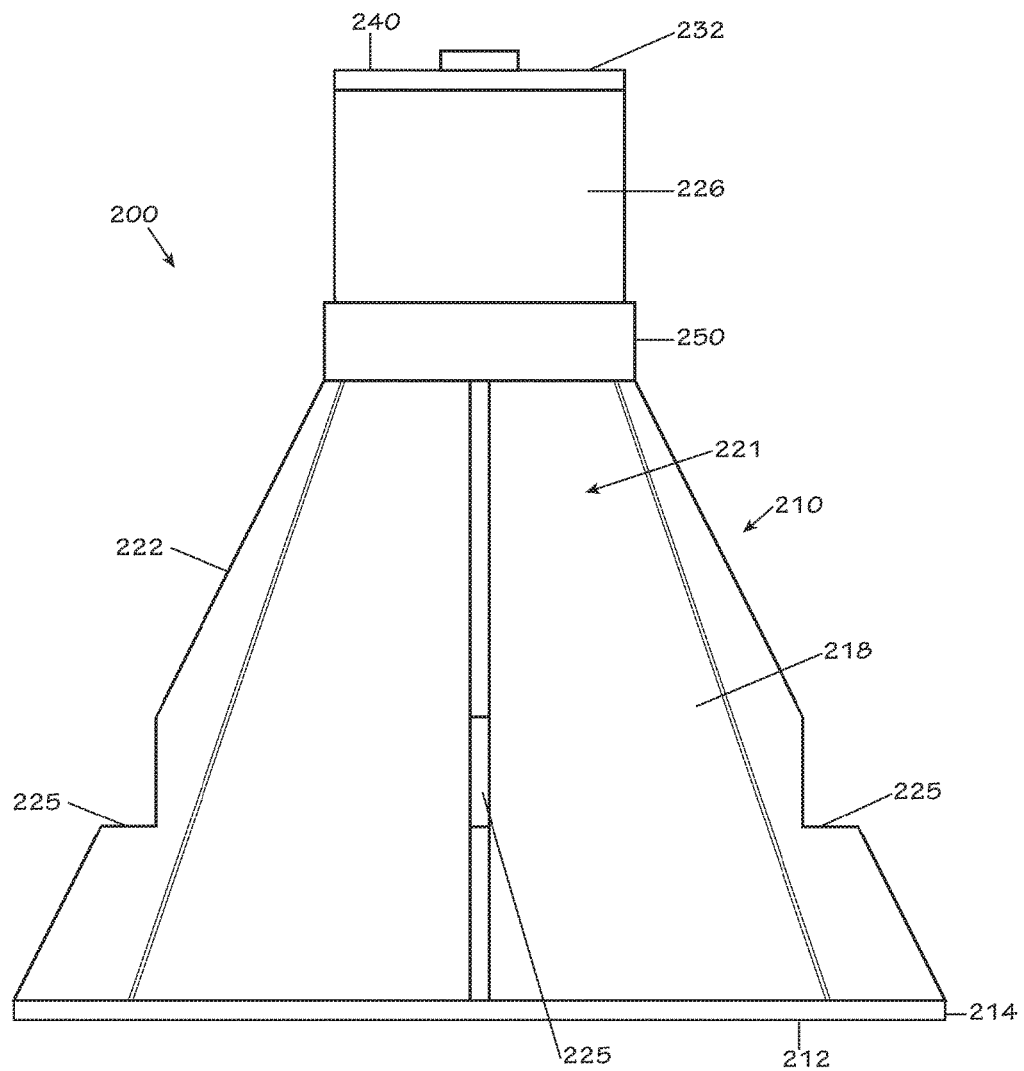
FIG. 12 is a side elevation view of the shroud of FIG. 10 with the marker removed.

FIG. 12 illustrates the shroud 200 as shown in FIGS. 10 and 11, but with the marker 248 removed. The shroud 200 includes the closure 232 disposed on and removably attached to a centrally aligned neck 226 formed in the body 210 of the shroud 200. Formed on the body 210 between the skirt 218 and the neck 226 is a collar 250. The body 210 of the shroud 200 includes the skirt 218 extending around at least a majority of the body 210. Along the skirt 218 are disposed one or more supports 220 that reinforce the skirt 218 to allow the body 210 of the shroud 200 to withstand compressive and shear forces applied thereto. The supports 220 can take the form of ribs 222 extending at least a portion of the distance between the collar 250 and the base 214 of the body 210. Each rib 222 is shown extending outwardly from the skirt 218 and of trapezoidal configuration with the base of the rib 222 being wider than the top of the rib 222. Each rib 222 is attached to the flange 212 that extends outwardly from the bottom of the skirt 218. Each rib 222 can form an angle of approximately 90° with the flange 212. Each rib 222 includes a recess 225 formed therein for receiving a portion of the body of another shroud when the shrouds of the present disclosure are stacked one on top of the other for storage and/or shipment.

Figure 13:
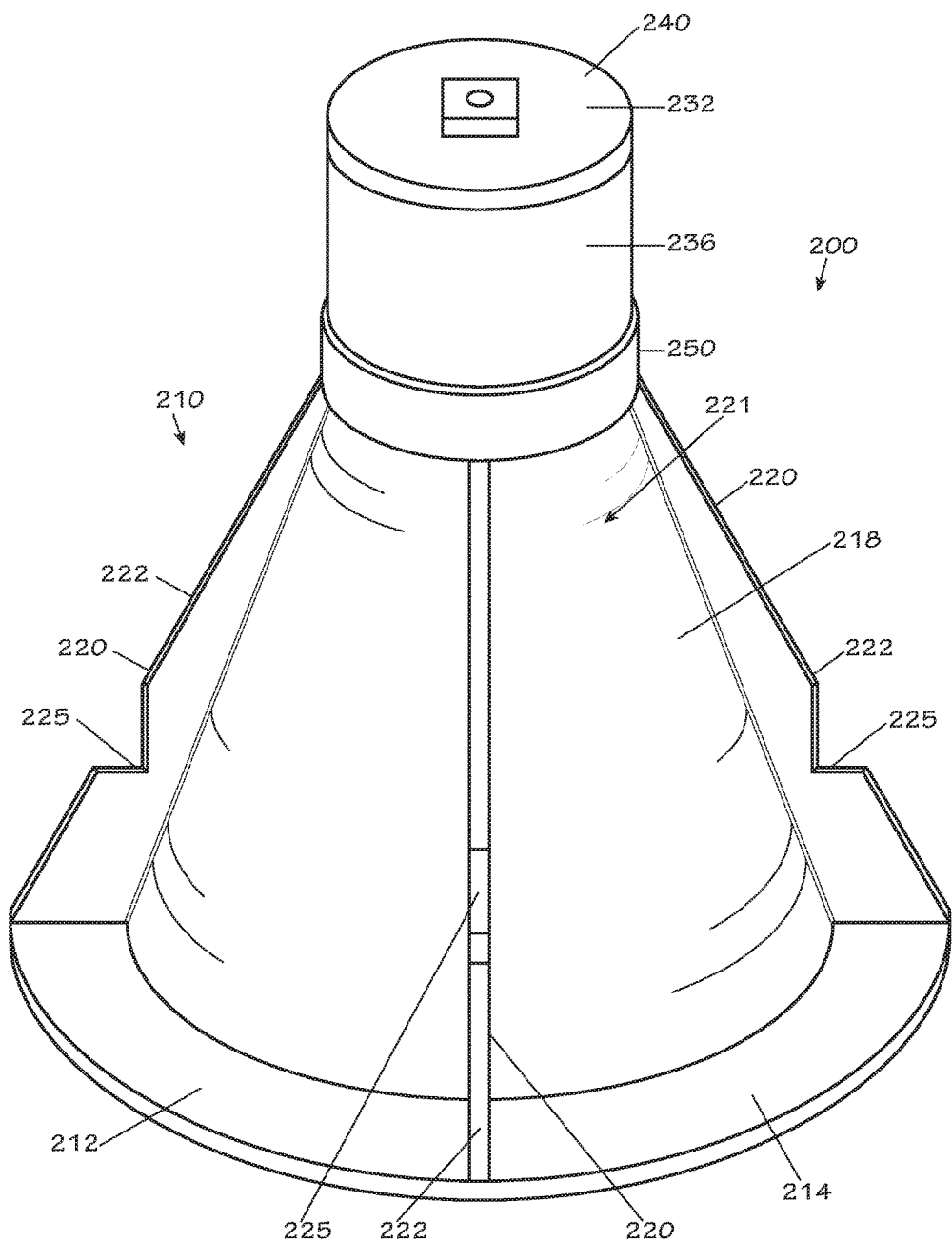
FIG. 13 is a perspective view of the shroud as shown in FIG. 12.

As shown in FIG. 13, the skirt 218 is frustoconical with the bottom portion of the skirt 218 having a larger diameter than the top portion thereof. The skirt 218 terminates at the base 214 of the body 210, with the flange 212 defining at least a portion of the base 214. The flange 212 is aligned with the skirt 218 to form an outer angle of greater than 90°.

Figure 14:
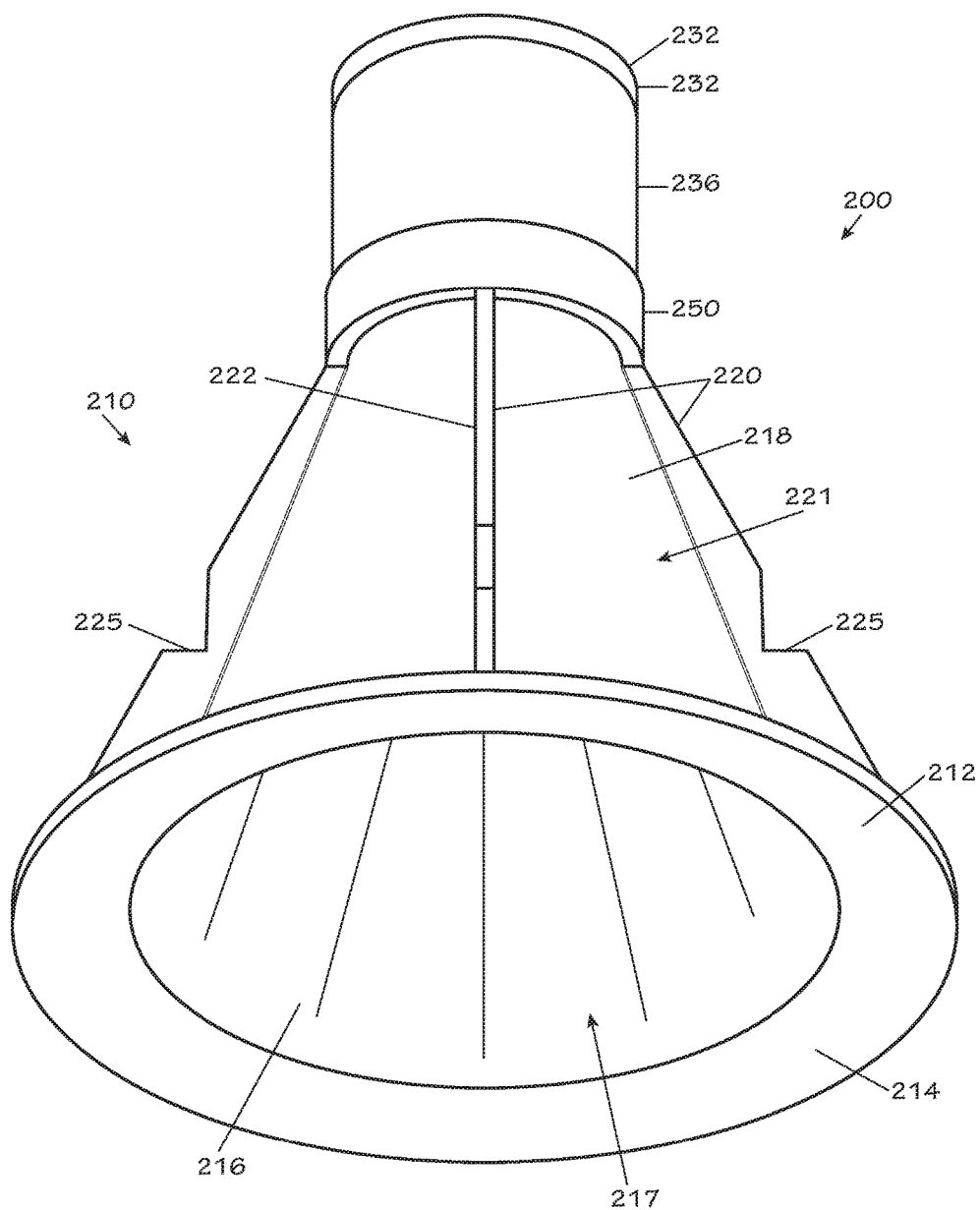
FIG. 14 is another perspective view of the shroud as shown in FIG. 12.
Figure 15:
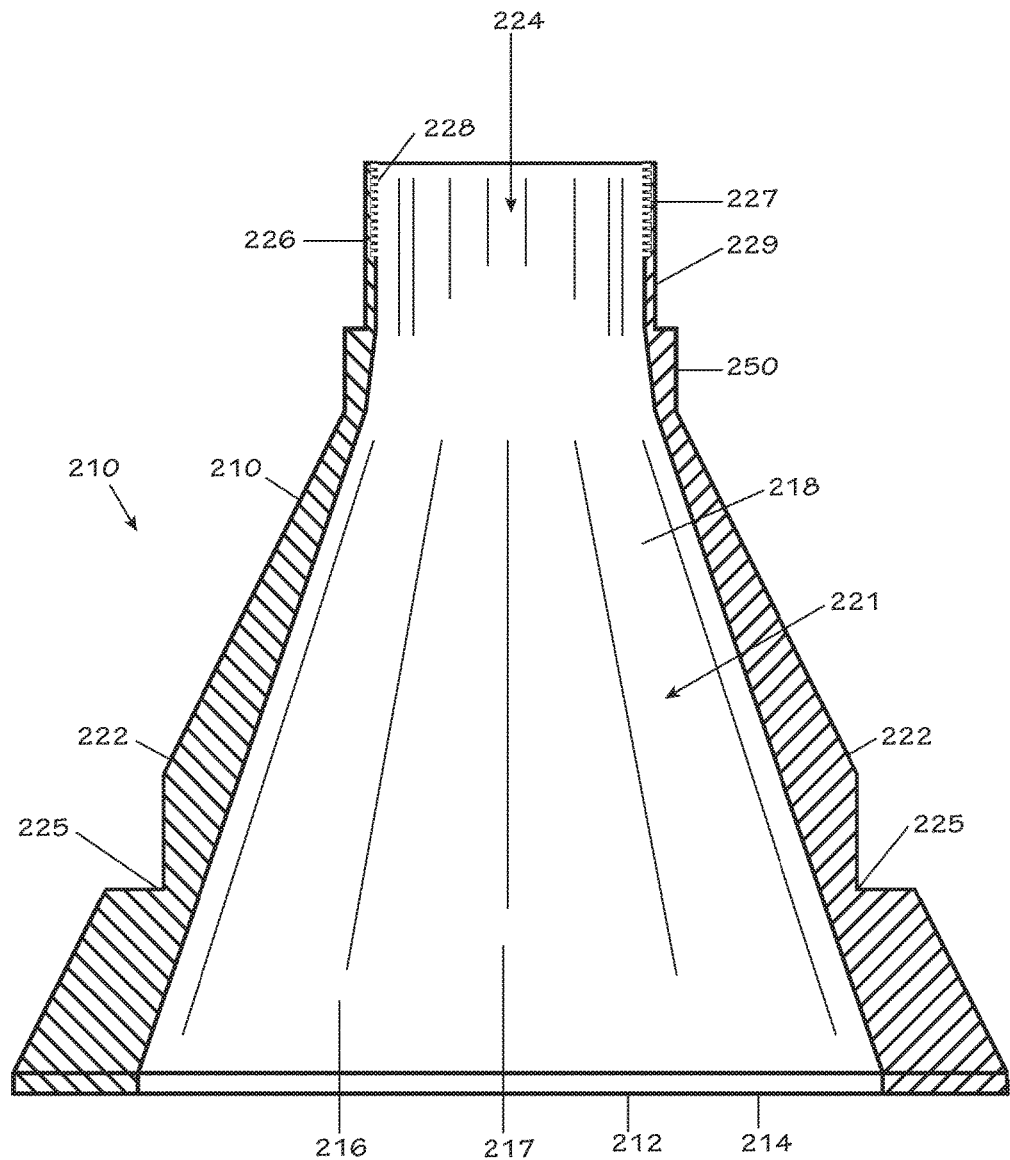
FIG. 15 is a cross sectional view of the body of the shroud shown in FIG. 10 with the closure and marker removed.

As shown in FIG. 14, the body 210 includes a base opening 216 formed in the base 214 thereof. As shown in FIG. 15, the skirt 218 defines, at least in part, a cavity 217 that has the base opening 216 at a bottom portion thereof and an access port 224 at a top portion thereof. The cavity 217 is configured to receive a portion of a utility line 160 therein. The body 210 of the shroud 200 includes an access port 224 formed in the neck 226. The neck 226 is defined by the neck sidewall 227 and is open to the cavity 217 defined by the skirt 218 and the base 214. The open neck 226 allows for access through access port 224 to the interior of cavity 217 when the shroud 200 is installed over a clean out line or other utility line. The access port 224, neck 226, cavity 217, skirt 218, base opening 216, and base 214 are all axially aligned. The axial alignment of these parts of the shroud 200 allow for access to the interior of the body 210 and distribution of weight and/or compressive force to the base of the body 210. The collar 250 can extend around the entire circumference of the neck 226 or a portion thereof. The thickness of the collar 250 is greater than the thickness of the neck sidewall 227 in order to impart strength. A thread 228 is formed on the interior surface of the neck sidewall 227. The present disclosure encompasses shrouds with bodies that include cavities formed therein by sidewalls that are not just frustoconical, but rather can be formed in generally other configurations, such as, for example, cylindrical, elliptical, rectangular and oblong.

Figure 16:
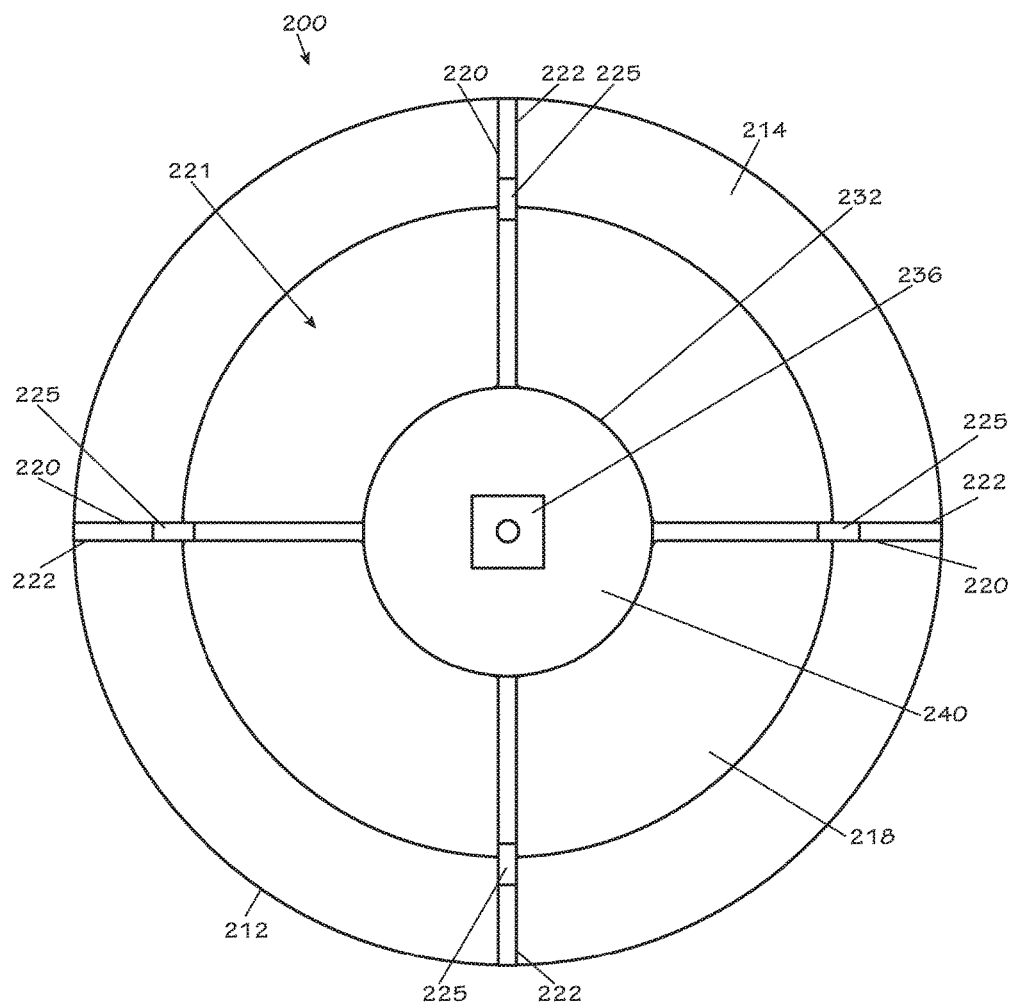
FIG. 16 is a top plan view of the shroud as shown in FIG. 12.
Figure 17:
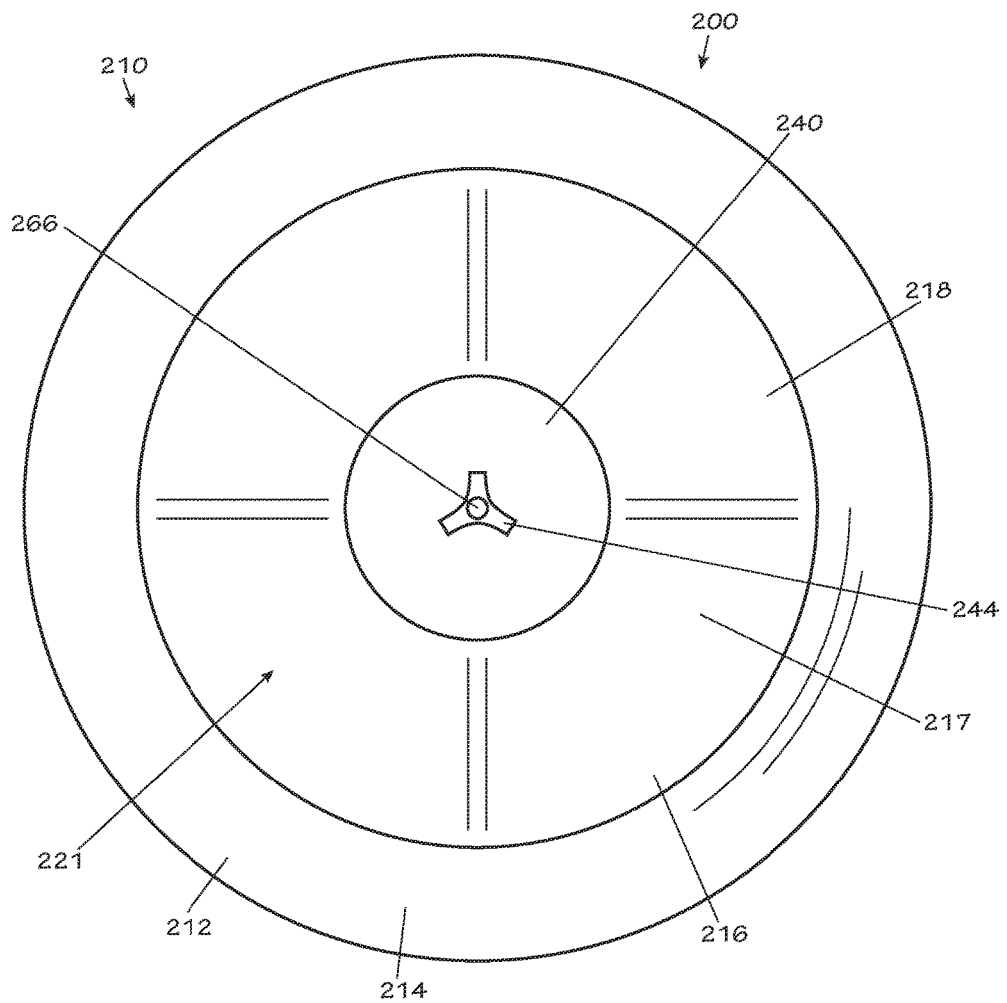
FIG. 17 is a bottom plan view of the shroud of FIG. 10.

As shown in FIG. 16, a plurality of supports 220 are disposed around the body 210 to reinforce the skirt 218 and the flange 212. Four supports 220 are shown in FIG. 16 disposed at 90° intervals around the skirt 218. As shown in FIG. 17, the top wall 240 of the closure 232, when the closure 232 is attached to the neck 226, can be axially aligned with the neck 226, the skirt 218, the cavity 217 and the flange 212. The flange 212 is circular, as shown in FIGS. 16 and 17.

As shown in FIG. 18, the closure 232 includes a top wall 240 and a sidewall 233 that has a thread 228 formed thereon.

When the closure 232 is connected to the body 210 of the shroud 100, the sidewall 233 of the closure 232 is disposed in the neck 226 and is threadably attached thereto. As shown in FIG. 15, the neck sidewall 227 includes a non-threaded portion 229 disposed proximate to the collar 250 and which can reinforce the closure 232, when connected to the neck 226, against shear forces applied to the closure 232, such as when equipment or a vehicle runs over the closure 232, thereby reducing the likelihood that the closure 232 would be broken off from the body 210 of the shroud 200 when subjected to such a force. The shroud 200 also can include a metal insert 270 that can be used to aid in the location of the shroud 200 with a metal detector. The metal insert 270, shown in FIG. 18, is in the form of a ring that can be disposed between the closure 232 and the neck 226.

Figure 19:
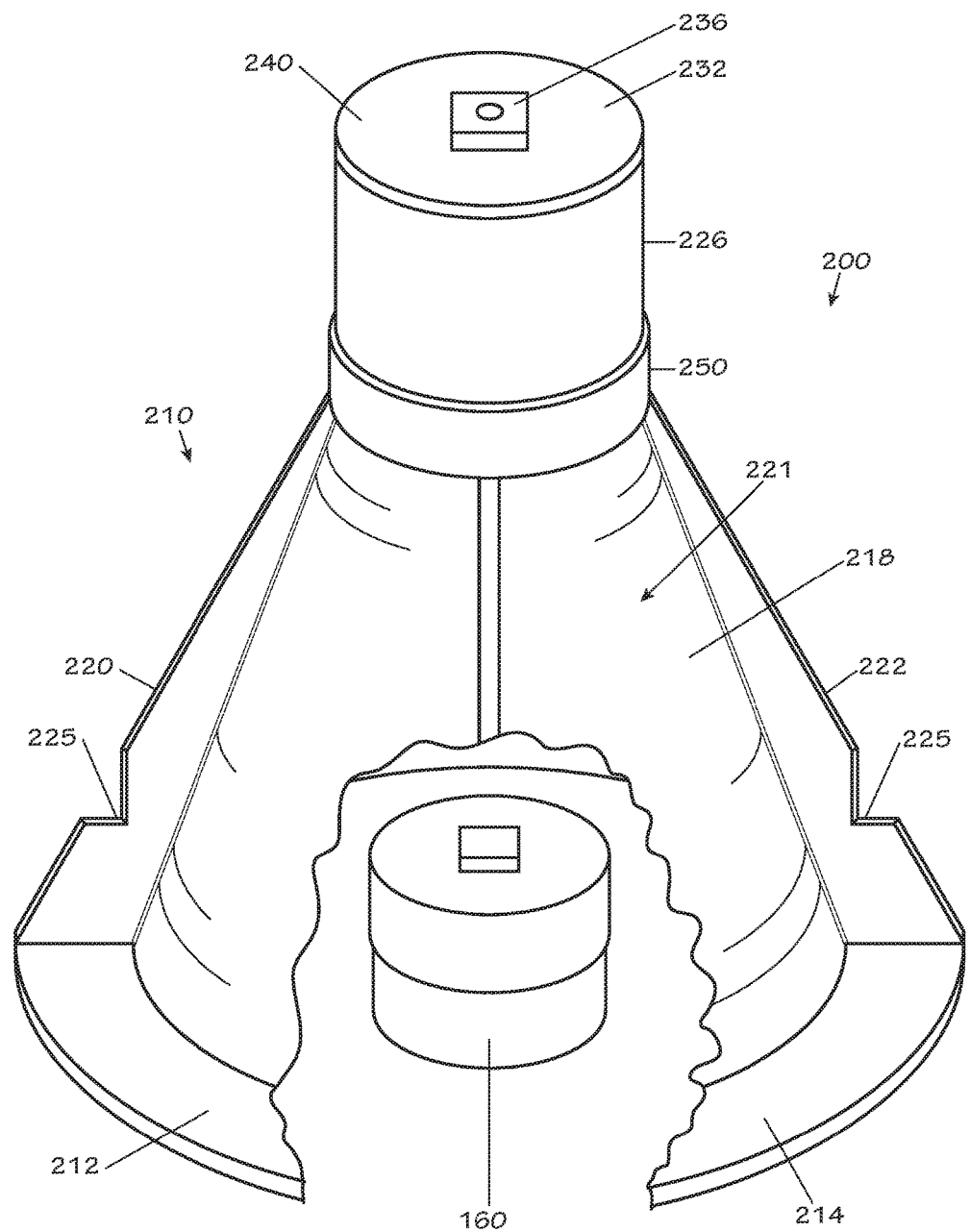
FIG. 19 is a partial cutaway perspective view of the shroud shown in FIG. 12 installed in ground over a sewer clean out line.

As shown in FIG. 19, the shroud 200 can be placed over the end of a utility line 160 so that the end of the utility line 160 is disposed within the cavity 217. The base 214 extends around the utility line 160 and rests on aggregate material. With the aggregate material enclosing the base opening 216 formed in the base 214, the cavity 217 is enclosed. The shroud 200 is aligned over the utility line 160 so that access to the utility line 160 is available through the neck 226 of the body 210, when the closure 232 is removed from the neck 226.

The body 210 and the closure 232 of the shroud 200 can be formed from various materials have sufficiently high elastic modulus and high compressive, flexural and impact strength and can include, but are not limited to, metal, such as cast iron, concrete, ceramic, high density polymers and combinations thereof. In one aspect, the parts of the shroud can be formed of one or more polymers or monomeric moieties including, but not limited to, polycarbonate, polyimide, acetal copolymer, polyamide-imide, polyethylene terephthalate, acrylic, ultra high density polyethylene, fiber reinforced polymers, monomers, copolymers and combinations thereof.

The present disclosure also encompasses a method of protecting a portion of a utility line comprising the steps of positioning a shroud over a portion of a utility line, wherein the shroud does not contact the utility line, and wherein the shroud comprises a base with a flange extending therefrom and wherein the flange is disposed on and supported by an aggregate material. The method further comprises the step of aligning a marker connected to the shroud wherein the marker extends upward from grade level. In another aspect, the end of the utility line is disposed within a cavity defined by the body of the shroud. The shroud further can comprise a skirt defining a portion of the cavity, and, additionally, the skirt can be reinforced by one or more supports formed thereon. In yet another aspect, the utility line comprises a sewer clean out line. In still a further aspect, the shroud comprises an access port formed in the body. In yet another aspect, the shroud comprises a closure removably connected to the body of the shroud, wherein the closure covers the access port when connected to the body of the shroud. In still a further aspect, the method can include the step of providing the end of a utility line below grade level. In another aspect, the method further can comprise disposing aggregate material over the shroud, wherein the shroud is at least partially covered by the aggregate material.

The alignments and configurations of the parts of the shroud disclosed herein can be varied without departing from the scope of the present disclosure. The shrouds encompassed by the present disclosure can include overall heights that vary from the examples and can exhibit ratios of the marker height to the shroud body height that vary from the stated examples. Other embodiments of shroud and method set forth in the present disclosure will be apparent to those skilled in the art from their consideration of the specification and practice of the present disclosure disclosed in this document. The applicant intends that the specification and examples be considered as exemplary only, with the true scope and spirit of the present disclosure being indicated by the following claims.

The invention claimed is:

1. A shroud for covering an in-ground utility line, the shroud comprising:
   a body comprising a neck, a base disposed distal from the neck, and a skirt disposed between the base and the neck, a flange extending from the skirt, and a collar disposed between the neck and the skirt, wherein the skirt defines at least a portion of a cavity, wherein the base defines a base opening, wherein the base opening opens to the cavity, wherein the neck defines at least a portion of an access port, wherein the access port is in communication with the cavity, wherein the body further comprises a plurality of ribs connected to the skirt, wherein the cavity is configured to receive a portion of an in-ground utility line through the base opening, wherein the base is wider than the neck, wherein the neck and the skirt are axially aligned;
   a closure removably connected to the neck to cover the access port; and,
   a marker mounted to the body, wherein the marker comprises a marker top and a marker base, wherein the marker base is aligned proximal to the base and the marker top is aligned distal to the base.

2. The shroud of claim 1, wherein the marker is operably connected to the closure.

3. The shroud of claim 1, wherein the marker is pivotally mounted to the body.

4. The shroud of claim 3, wherein the marker is operably connected to a spring.

5. The shroud of claim 1, wherein the marker comprises an elongated marker body axially aligned with the base of the body.

6. A shroud for covering an in-ground utility line, the shroud comprising:
   a body comprising a base, a skirt extending upward from the base, a flange projecting from the skirt, and a neck connected to the skirt, wherein the skirt defines at least a portion of a cavity within the body, wherein the base defines a base opening, wherein the neck defines an access port, wherein the access port and the base opening are in communication with the cavity; and,
   a marker operably connected to the body, wherein the marker comprises a marker top and a marker base, wherein the marker base is proximal to the base and the marker top is distal from the base, wherein the marker top is alignable in the range of about 0.5 m to about 2.5 m from the base.

7. The shroud of claim 6, wherein the marker is pivotally mounted to the body.

8. The shroud of claim 7, further comprising a spring operably connected to the marker.

9. The shroud of claim 6, further comprising a closure removably connected to the neck to cover the access port.

10. The shroud of claim 9, wherein the marker is mounted to the closure.

11. The shroud of claim 9, wherein the neck comprises a first thread formed thereon and the closure comprises a second thread formed thereon, and wherein the closure is threadably connected to the neck.

12. The shroud of claim 6, wherein the skirt and the neck are axially aligned.

13. The shroud of claim 6, wherein the body further comprises a collar disposed between the neck and the skirt, wherein the collar comprises a collar sidewall and the neck comprises a neck sidewall, and wherein the collar sidewall is thicker than the neck sidewall.

14. The shroud of claim 6, further comprising a metal insert operably connected to the body.

15. The shroud of claim 6, wherein the marker comprises an elongated marker body, wherein the marker top is disposed at a first end of the elongated marker body and the marker base is disposed at a second end of the elongated marker body.

16. The shroud of claim 6, wherein the base comprises a base width and the skirt comprises a skirt height, and wherein the ratio of the base width to the skirt height is greater than 1:1.

17. The shroud of claim 6, wherein the marker comprises a marker height and the body comprises a body height, and wherein the ratio of the marker height to the body height is greater than about 2:1.

18. A shroud for covering a portion of utility line, the shroud comprising:
- a body comprising a top, a base and a sidewall disposed between the top and the base, wherein the sidewall defines at least a portion of a cavity disposed within the body, wherein the base defines a base opening therein, wherein the base opening is in communication with the cavity, wherein the cavity is configured to receive at least a portion of a utility line through the base opening, wherein the body defines an access port therein, wherein the access port is in communication with the cavity; and,
- a marker operably connected to the body, wherein the marker comprises an elongated marker body, wherein the elongated marker body comprises a marker height and wherein the body comprises a body height and wherein the ratio of the marker height to the body height is greater than about 2:1, wherein the base opening comprises a base opening diameter, and wherein the ratio of the base opening diameter to the body height is greater than about 1:1.

19. The shroud of claim 18, further comprising a closure removably connected to the body, wherein the closure covers the access port.

20. The shroud of claim 19, wherein the body further comprises a neck, wherein at least a portion of the access port is defined by the neck, and wherein the closure is removably connected to the neck.

21. The shroud of claim 18, wherein the body further comprises a flange extending from the sidewall.

22. The shroud of claim 21, wherein the body further comprises a rib connected to both the sidewall and the flange.

23. A shroud for covering a portion of utility line, the shroud comprising:
- a body comprising a top, a base and a sidewall disposed between the top and the base, wherein the sidewall defines at least a portion of a cavity disposed within the body, wherein the base defines a base opening therein, wherein the base opening is in communication with the cavity, wherein the cavity is configured to receive at least a portion of a utility line through the base opening, wherein the body defines an access port therein, wherein the access port is in communication with the cavity; and,
- a marker operably connected to the body, wherein the marker comprises an elongated marker body, wherein the elongated marker body comprises a marker height and wherein the body comprises a body height and wherein the ratio of the marker height to the body height is greater than about 2:1, wherein the marker is pivotally connected the body.

24. The shroud of claim 23, further comprising a spring operably connected to the marker.

25. A shroud for covering a portion of utility line; the shroud comprising:
- a body comprising a neck, a collar connected to the neck, a frustoconical skirt depending from the collar, a flange extending outwardly from the frustoconical skirt, a plurality of ribs connected to both the frustoconical skirt and the flange, a base connected to the collar by the frustoconical skirt, wherein the frustoconical skirt, defines at least a portion of a cavity in the body, wherein the base defines a base opening therein, wherein the base opening is in communication with the cavity, wherein the cavity is configured to receive at least a portion of a utility line, wherein the neck defines an access port, wherein the access port is in communication with the cavity, wherein the neck comprises a first thread formed thereon;
- a closure comprising a second thread, wherein the closure is threadably connected to the neck of the body; and,
- a marker pivotally mounted to the body by a mounting assembly, wherein the marker comprises an elongated marker body comprising a first end and an opposed second end, wherein the mounting assembly comprises a spring operably connected to the elongated marker body.

* * * * *